United States Patent
Lee et al.

(10) Patent No.: US 11,254,994 B2
(45) Date of Patent: *Feb. 22, 2022

(54) METHOD FOR REFINING MAGNETIC DOMAIN OF GRAIN-ORIENTED ELECTRICAL STEEL PLATE AND DEVICE THEREFOR

(71) Applicant: POSCO, Pohang-si (KR)

(72) Inventors: Gyoo-Taek Lee, Pohang-si (KR); Ju Seung Lee, Pohang-si (KR); Seong-Cheol Hong, Pohang-si (KR)

(73) Assignee: POSCO, Pohang-si (KR)

( * ) Notice: Subject to any disclaimer, the term of this patent is extended or adjusted under 35 U.S.C. 154(b) by 164 days.

This patent is subject to a terminal disclaimer.

(21) Appl. No.: 16/470,926

(22) PCT Filed: Dec. 11, 2017

(86) PCT No.: PCT/KR2017/014457
§ 371 (c)(1),
(2) Date: Jun. 18, 2019

(87) PCT Pub. No.: WO2018/117510
PCT Pub. Date: Jun. 28, 2018

(65) Prior Publication Data
US 2020/0087744 A1    Mar. 19, 2020

(30) Foreign Application Priority Data

Dec. 23, 2016  (KR) .................. 10-2016-0178413
Aug. 18, 2017  (KR) .................. 10-2017-0104846

(51) Int. Cl.
*C21D 8/12*   (2006.01)
*C21D 10/00*  (2006.01)
(Continued)

(52) U.S. Cl.
CPC .......... *C21D 8/1294* (2013.01); *B23K 26/364* (2015.10); *B23K 26/57* (2015.10);
(Continued)

(58) Field of Classification Search
None
See application file for complete search history.

(56) References Cited

U.S. PATENT DOCUMENTS

| 4,203,784 A | 5/1980 | Kuroki et al. |
| 2012/0084056 A1* | 4/2012 | Bucher ............. G01B 11/0625 702/172 |

(Continued)

FOREIGN PATENT DOCUMENTS

| CN | 102260777 A | 11/2011 |
| CN | 103645195 A | 3/2014 |

(Continued)

OTHER PUBLICATIONS

Chinese Search Report cited in Chinese Office Action dated Jul. 21, 2020 issued in Chinese Patent Application No. 2017800800672.

(Continued)

*Primary Examiner* — Scott R Kastler
(74) *Attorney, Agent, or Firm* — Morgan, Lewis & Bockius LLP

(57) ABSTRACT

A method for refining a magnetic domain of a grain-oriented electrical steel strip is provided, including a steel strip supporting roll position adjusting step of controlling a position of the steel strip in a vertical direction while supporting the steel strip proceeding along a production line, a laser irradiating step of forming a groove on a surface of the steel strip by irradiating a laser beam onto the surface of the steel strip to melt the steel strip, and a detecting step of detecting a defect in the groove formed on the surface of the steel strip while the steel strip proceeds, so as to be able to (Continued)

detect whether the groove is defective by confirming a machining state of a magnetic domain refined groove formed on the surface of the steel strip in a working process.

9 Claims, 9 Drawing Sheets

(51) Int. Cl.
  *B23K 26/364* (2014.01)
  *H01F 1/16* (2006.01)
  *B23K 26/57* (2014.01)
(52) U.S. Cl.
  CPC .............. *C21D 8/12* (2013.01); *C21D 10/00* (2013.01); *H01F 1/16* (2013.01); *C21D 2201/05* (2013.01)

(56) References Cited

U.S. PATENT DOCUMENTS

| 2019/0032167 A1* | 1/2019 | Lim | B23K 26/40 |
| 2019/0054570 A1* | 2/2019 | Hong | B23K 26/359 |
| 2020/0087744 A1* | 3/2020 | Lee | C21D 8/12 |

FOREIGN PATENT DOCUMENTS

| EP | 0870843 A1 | 10/1998 |
| EP | 2902778 A1 | 8/2015 |
| EP | 3098328 A1 | 11/2016 |
| JP | S53-137016 A | 11/1978 |
| JP | S55-18566 A | 2/1980 |
| JP | H05-339634 A | 12/1993 |
| JP | H06-057857 B2 | 8/1994 |
| JP | H06-063037 B2 | 8/1994 |
| JP | H07-072300 B2 | 8/1995 |
| JP | 2000-109961 A | 4/2000 |
| JP | 2003-117670 A | 4/2003 |
| JP | 2011-136362 A | 7/2011 |
| JP | 5826405 B2 | 12/2015 |
| KR | 10-2011-0025282 A | 3/2011 |
| KR | 10-2012-0073913 A | 7/2012 |
| KR | 10-2012-0073914 A | 7/2012 |
| KR | 10-2013-0068489 A | 6/2013 |
| KR | 10-2014-0021915 A | 2/2014 |
| KR | 10-2014-0087126 A | 7/2014 |
| KR | 10-2015-0000927 A | 1/2015 |
| KR | 10-2016-0069869 A | 6/2016 |
| KR | 10-1626599 B1 | 6/2016 |
| KR | 10-2016-0082603 A | 7/2016 |
| KR | 10-2017-0088246 A | 8/2017 |

OTHER PUBLICATIONS

European Office Action dated Jun. 18, 2020 issued in European Patent Application No. 17884408.0.

Extended European Search Report dated Aug. 23, 2019 issued in European Patent Application No. 17884408.0.

\* cited by examiner (a)             (b)

METHOD FOR REFINING MAGNETIC DOMAIN OF GRAIN-ORIENTED ELECTRICAL STEEL PLATE AND DEVICE THEREFOR

CROSS-REFERENCE OF RELATED APPLICATIONS

This application is the U.S. National Phase under 35 U.S.C. § 371 of International Patent Application No. PCT/KR2017/014457, filed on Dec. 11, 2017, which in turn claims the benefit of Korean Patent Application Nos. 10-2016-0178413, filed Dec. 23, 2016 and 10-2017-0104846, filed Aug. 18, 2017, the entire disclosures of each application are incorporated by reference herein.

TECHNICAL FIELD

The present invention relates to a method and apparatus for permanently refining a magnetic domain of a grain-oriented electrical steel strip by irradiating the oriented electrical steel strip with a laser.

BACKGROUND ART

As an example, a grain-oriented electrical steel strip having magnetic properties of low iron loss and high magnetic flux density is required in order to reduce power loss of an electrical device such as a transformer and to improve efficiency thereof.

In order to reduce the iron loss of the grain-oriented electrical steel strip, a technique of reducing the iron loss by applying a mechanical method to a surface of the steel strip or by irradiating a laser beam on the surface of the steel strip so as to refine magnetic domains in a direction perpendicular to a rolling direction is disclosed.

The magnetic domain refining method may be substantially divided into a temporary magnetic domain refining method and a permanent magnetic domain refining method, depending on whether or not a magnetic domain refining effect is maintained after stress-removal annealing.

The temporary magnetic domain refining method has a disadvantage of losing a magnetic domain refining effect after the stress-removal annealing. In the temporary magnetic domain refining method, the magnetic domains are refined by forming a local compressive stress portion on the surface of the steel strip. However, since such a method causes damage to an insulating coating layer on the surface of the steel strip, it requires a re-coating process, and since a refining process is performed in an intermediate process thereof, rather than a final product, there is a disadvantage in that a manufacturing cost increases.

The permanent magnet domain refining method may maintain an iron loss improving effect even after a heat treatment. Methods using an etching method, a roll method, and a laser method are mainly used for the permanent magnetic domain refining process. In a case of the etching method, it is difficult to control a groove formation depth and width, it is difficult to guarantee the iron loss property of the final product, and there are disadvantageous in that it is not environmentally friendly because an acid solution is used. In a case of the method of using the roll, there is a disadvantage in that stability, reliability, and processing for machining are complicated.

In the method of using a laser for permanently refining the magnetic domains, a laser beam is irradiated to the surface of the steel strip in a state in which the steel strip is supported and a tension thereof is adjusted, thereby forming a molten groove on the surface of the steel strip and refining the magnetic domain. As described above, in the refining of the magnetic domain using the laser, it is required to improve and optimize the process thereof more effectively so that the iron loss of the electrical steel strip may be reduced and the magnetic flux density may be increased while high-speed processing may be performed.

DISCLOSURE

The present invention provides a method and apparatus for refining magnetic domains of a grain-oriented electrical steel strip that may increase magnetic domain refining efficiency, improve workability, and increase processing capability by optimizing equipment, and a process therefor.

A method and apparatus for refining magnetic domains of a grain-oriented electrical steel strip that may detect whether a groove is defective by accurately checking a machining state of a magnetic domain refinement groove formed on a surface of a steel strip in a work process is provided.

A method and apparatus for refining magnetic domains of a grain-oriented electrical steel strip that may optimize a machining state of a magnetic domain refinement groove formed on a surface of a steel strip are provided.

A method and apparatus for refining magnetic domains of a grain-oriented electrical steel strip that may check a machining state of a magnetic domain refinement groove and immediately reflect the machining state to equipment are provided.

A method and apparatus for refining magnetic domains of a grain-oriented electrical steel strip that may increase productivity by shortening a time required for initial setting of equipment are provided.

A method and apparatus for refining magnetic domains of a grain-oriented electrical steel strip that may always operate equipment in an optimum state and may quickly correct and repair a defective refinement groove are provided.

An embodiment of the present invention provides a method for refining a magnetic domain of a grain-oriented electrical steel strip, including a steel strip supporting roll position adjusting step of controlling a position of the steel strip in a vertical direction while supporting the steel strip proceeding along a production line, a laser irradiating step of forming a groove on a surface of the steel strip by irradiating a laser beam onto the surface of the steel strip to melt the steel strip, and a detecting step of detecting a defect in the groove formed on the surface of the steel strip while the steel strip proceeds.

The detecting step may include a step of measuring a size of the groove formed in the steel strip.

The detecting step may further include a step of detecting a formation interval between the grooves formed in the steel strip.

The detecting step may measure the groove of the steel strip by a leakage magnetic flux measuring method.

The detecting step may include a step of magnetizing the surface of the steel strip by applying a magnetic force thereto, a step of detecting a leakage magnetic flux formed by the groove, and a step of confirming a defect in the groove by calculating the detected leakage magnetic flux.

The method for refining the magnetic domain of the grain-oriented electrical steel strip may further include a correcting step of adjusting a laser focal point position of the steel strip according to a result found in the detecting step.

The correcting step may include a step of setting a depth of the groove of a steady state as a reference value, a calculating step of comparing a detected depth of the groove with the reference value, and a position adjusting step of adjusting a position of the steel strip supporting roll or a position of a condensing mirror in accordance with a depth deviation of the groove detected in the calculating step to adjust a focus position with respect to the steel strip.

The position adjusting step may include a first adjusting step of adjusting the position of the steel strip supporting roll or the position of the condensing mirror by a predetermined value in one of up and down directions when a deviation between a depth of an actual groove and the reference value is 2 μm or more, an additional adjusting step of comparing and calculating a depth of the groove detected after the first adjusting and the reference value and then further adjusting the position of the steel strip supporting roll or the position of the condensing mirror by a predetermined value in the same direction as in the first adjusting when the calculated deviation is less than 2 μm and equal to or greater than 1 μm, a reverse adjusting step of adjusting the position of the steel strip supporting roll or the position of the condensing mirror by a predetermined value in a direction opposite to that of the first adjusting when the depth of the groove detected after the first adjusting is compared and calculated with the reference value to determine that the calculated deviation is 2 μm or more, and an additional reverse adjusting step of comparing and calculating the depth of the groove detected after the reverse adjusting and the reference value and then adjusting the position of the steel strip supporting roll or the position of the condensing mirror by a predetermined value in the same direction as in the reverse adjusting when the calculated depth deviation is less than 2 μm and equal to or greater than 1 μm.

The correcting step may further include an initial position setting step of setting the positions of the steel strip supporting roll and the condensing mirror in an initial process.

The initial position setting step may include a step of changing the position of the steel strip supporting roll according to a set time interval, a step of detecting a depth change of the groove according to a position change of the steel strip supporting roll, a step of detecting the position of the steel strip supporting roll, a step of calculating the position of the steel strip supporting roll when the depth of the groove is the deepest through the position of the steel strip supporting roll and depth data of the groove corresponding to the position of the steel strip supporting roll, and a step of adjusting the position of the steel strip supporting roll or the condensing mirror irradiating a laser according to the calculated value.

In the laser irradiating step, regarding the surface of the steel strip that proceeds while contacting a surface of the steel strip supporting roll in a form of a circular arc, a laser beam may be irradiated from a reference point which is a laser beam irradiation position set when an irradiation direction of a laser beam passes a central axis of the steel strip supporting roll to a position spaced apart from a center of the steel strip supporting roll by a predetermined angle along an outer circumferential surface.

In the laser irradiating step, the laser beam may be irradiated in a range spaced apart from the reference point by 3 to 7 degrees along the outer circumferential surface thereof from the center of the steel strip supporting roll.

The method for refining the magnetic domain may further include a step of setting and maintaining an internal operating environment of the laser room in which the laser irradiation is performed.

The method for refining the magnetic domain may further include a tension control step of applying a tension to the steel strip so that the steel strip is maintained to be flat and spread.

The method for refining the magnetic domain may further include a meandering control step of allowing the steel strip to move along a center of the production line without being deviated left and right.

The setting and maintaining step may include a step of isolating the inside of the laser room from the outside to block external contaminants from inflowing, and a step of controlling an internal temperature, pressure, and humidity of the laser room.

The method for refining the magnetic domain may further include a post-treatment step of removing hill-up and spatter formed on the surface of the steel strip through the laser irradiating step.

The post-treatment step may include a brush step of removing the hill-up and spatter attached to the surface of the steel strip with a brush roll.

The post-treatment step may include a cleaning step of electrolytically reacting the steel strip with an alkali solution to further remove the hill-up and spatter remaining on the surface of the steel strip, and a filtering step of removing foreign materials, which are removed from the steel strip in the cleaning step and then are contained in the alkali solution, from the alkali solution.

The meandering control step may includes a meandering amount measuring step of measuring a meandering amount of a width central position of the steel strip which is deviated from a center of the production line, and a meandering amount control step of controlling the meandering amount of the steel strip by adjusting a moving direction of the steel strip by rotating and moving a shaft of the steering roll according to the meandering amount of the steel strip measured in the meandering amount measuring step.

In the meandering amount control step, the meandering amount of the steel strip may be controlled within ±1 mm.

The tension control step may include a steel strip tension applying step of applying a tension to the steel strip by a tension bridle roll, a steel strip tension measuring step of measuring the tension of the steel strip subjected to the steel strip tension applying step, and a steel strip tension controlling step of controlling the tension of the steel strip by adjusting a speed of the tension bridle roll in accordance with the tension of the steel strip measured in the steel strip tension measuring step.

The steel strip supporting roll position adjusting step may include a step of supporting the steel strip positioned in the laser irradiating step with the steel strip supporting roll, a luminance measuring step of measuring a brightness of a flame generated when a laser beam is irradiated on the steel strip in the laser irradiating step, and a step of adjusting the position of the steel strip supporting roll by the steel strip supporting roll position control system according to the brightness of the flame measured in the luminance measuring step so that the steel strip is positioned within a depth of focus of the laser.

The laser irradiating step may include a laser irradiating and energy transmitting step of irradiating, by the optical system receiving the laser beam irradiated by the laser oscillator, on the steel strip to form a groove having an upper width of 70 μm or less, a lower width of 10 μm or less, and a depth of 3 to 30 μm, and of transmitting a laser energy density within a range of 1.0 to 5.0 J/mm² to the steel strip required for melting the steel strip so as to produce a re-solidified portion remaining on an inner wall surface of a groove of a molten portion while irradiating the laser.

The laser irradiating step may include a laser beam oscillating control step of turning on, by the laser oscillator controller, the laser oscillator in a normal working condition and of controlling the laser oscillator to be off when the steel strip meandering amount is 15 mm or more.

In the laser irradiating step, the laser oscillator may oscillate a single mode continuous wave laser beam.

In the laser irradiating step, the optical system may control a laser scanning speed so that an interval of the laser irradiation lines may be adjusted by 2 to 30 mm in a rolling direction.

The laser irradiating step may further include an angle changing step of changing an angle of an irradiation line of the laser beam irradiated on the surface of the steel strip.

In the angle changing step, the angle of the irradiation line of the laser beam may be changed to a range of ±4 degrees with respect to a width direction of the steel strip.

The laser irradiating step may further include a dust collecting step of sucking and removing fumes and molten iron generated while the laser beam is irradiated. The dust collecting step may include a spraying step of spraying compressed dry air into the groove of the steel strip to remove molten iron remaining in the groove.

The laser irradiating step may further include a blocking step of blocking scattered light and heat of the laser beam from entering the optical system of the laser irradiating equipment.

An embodiment of the present invention provides an apparatus for refining a magnetic domain of a grain-oriented electrical steel strip, including steel strip supporting roll position adjusting equipment that controls a position of a steel strip in up and down directions while supporting the steel strip moving along a production line, laser irradiating equipment that irradiates a laser beam on the steel strip to melt it to form a groove thereon, and a detector that detects whether or not the groove is defective by checking a state of the groove formed on the surface of the steel strip.

The detector may include a non-conductive roll supporting a moving steel strip, a leakage flux measurer including a magnetizer that applies a magnetic force to the surface of the steel strip passing through the non-conductive roll to magnetize the surface of the steel strip and a magnetic sensor that is spaced apart from the steel strip and measures a leakage magnetic field of the groove formed in the steel strip, and a controller that calculates an output signal of the magnetic sensor to check whether the groove is defective.

The controller may include a signal changer that changes the leakage magnetic field signal detected by the magnetic sensor to a groove size signal, and a calculator that compares and calculates a groove size reference value that is preset in a steady state and an actual groove size value outputted from the signal changer to determine whether the groove is defective.

The calculator may compare and calculate the preset steady state groove size reference value and the actual groove size value outputted from the signal changer to determine whether the groove is defective.

The controller may further include an equipment controller that controls driving of the equipment in accordance with an output signal of the calculator.

The detector may further include a driver that adjusts an interval between the leakage magnetic flux measurer and the steel strip.

The driver may include a rail installed on the equipment toward the steel strip, a moving carriage moved along the rail, and a movable frame movably installed on the moving carriage and including a front side at which the leakage magnetic flux measurer is provided.

The controller may further include a driving controller that is connected to the driver and controls and operates the driver according to an output signal of the equipment controller.

A corrector that adjusts a laser focal point position of the steel strip according to a result measured by the detector may be further included.

The steel strip supporting roll position adjusting equipment may include a steel strip supporting roll position control system that controls the position of the steel strip supporting roll, which supports the steel strip, according to a laser irradiation position of the laser irradiating equipment.

The corrector may adjust the position of the steel strip supporting roll or the position of the condensing mirror for irradiating the laser.

Regarding the surface of the steel strip that proceeds while contacting a surface of the steel strip supporting roll in a form of a circular arc, the laser irradiating equipment may irradiate a laser beam from a reference point which is a laser beam irradiation position set when an irradiation direction of a laser beam passes a central axis of the steel strip supporting roll, to a position spaced apart from a center of the steel strip supporting roll by a predetermined angle along an outer circumferential surface.

The laser irradiating equipment may irradiate the laser beam in a range spaced apart from the reference point by 3 to 7 degrees along the outer circumferential surface thereof from the center of the steel strip supporting roll.

A laser room that isolates and accommodates the steel strip supporting roll position adjusting equipment and the laser irradiating equipment from the outside and that provides an operation environment for laser irradiation may be further included.

Tension control equipment for applying a tension to the steel strip so as to maintain the steel strip to be flat and spread may be further included.

Meandering control equipment that allows the steel strip to move along a center of the production line without being deviated left and right may be further included.

The laser room may be provided with an inner space formed to accommodate the laser irradiating equipment and the steel strip supporting roll position control equipment so as to isolate them from the outside, and an entrance and an exit formed at respective sides along the proceeding direction of the steel strip, and may include a positive pressure device for increasing an internal pressure thereof beyond an external pressure, an optical system lower frame for separating an upper space in which the laser oscillator of the laser irradiating equipment is disposed from a lower space through which the steel strip passes, and a constant temperature and humidity controller for controlling an internal temperature and humidity of the laser room.

Post-treatment equipment for removing the hill-up and spatter formed on the surface of the steel strip may be further included.

The post-treatment equipment may include a brush roll disposed at a rear side of the laser room to remove the hill-up and spatter of the steel strip surface.

The post-treatment equipment may include a cleaning unit that is disposed at a rear side of the brush roll and electrolytically reacts the steel strip with an alkali solution to further remove the hill-up and spatter remaining on the surface of the steel strip, and a filtering portion that is coupled to the cleaning unit and filters a foreign-material-contained alkali solution of the cleaning unit from the alkali solution.

The meandering control equipment may include a steering roll for changing the moving direction of the steel strip, a meandering measuring sensor for measuring a degree of deviation of a central position of a width of the steel strip from a center of the production line (meandering amount), and a steel strip center position control system for adjusting the moving direction of the steel strip by rotating and moving an axis of the steering roll according to an output value of the meandering measuring sensor.

The tension control equipment may include a tension bridle roll for inducing movement of the steel strip while applying the tension thereto, a steel strip tension measuring sensor for measuring the tension of the steel strip passing through the tension bridle roll, and a steel strip tension control system for adjusting a speed of the tension bridle roll according to the tension of the steel strip measured by the steel strip tension measuring sensor.

The steel strip supporting roll position adjusting equipment may include a steel strip supporting roll for supporting the steel strip at a position of the laser irradiating equipment, a luminance measuring sensor for measuring the brightness of the flame generated when the laser irradiating equipment irradiates the laser on the steel strip, and a steel strip supporting roll position control system for controlling the position of the steel strip supporting roll according to the brightness of the flame measured by the luminance measuring sensor.

The laser irradiating equipment may include a laser oscillator for oscillating a continuous wave laser beam, and an optical system that irradiates the laser beam oscillated by the laser oscillator on the steel strip to form a groove having an upper width of 70 μm or less, a lower width of 10 μm or less, and a depth of 3 to 30 μm, and transmits laser energy density within a range of 1.0 to 5.0 J/mm$^2$ to the steel strip required for melting the steel strip so as to produce a re-solidified portion remaining on an inner wall surface of a groove of a molten portion while irradiating the laser.

The laser irradiating equipment may further include a laser oscillator controller for turning on the laser oscillator in a normal working condition, and controlling the laser oscillator to be turned off when the steel strip meandering amount is 15 mm or more.

The laser oscillator may oscillate a single mode continuous wave laser beam.

The optical system may control a laser scanning speed so that the interval between the laser irradiation lines may be adjusted to 2 to 30 mm along a rolling direction.

In the laser irradiating equipment, the optical system for irradiating the steel strip with the laser beam may be rotated by the driver so that the optical system rotates with respect to the steel strip to change an angle of the irradiation line of the laser beam with respect to a width direction of the steel strip.

The laser irradiating equipment may further include a shielding portion that blocks scattered light and heat of the laser from flowing into the optical system.

The laser irradiating equipment may further include molten iron removing equipment for removing the fumes and spatter generated by the laser beam irradiation on the steel strip.

The molten iron removing equipment may include an air knife for spraying compressed dry air into the groove of the steel strip to remove molten iron remaining inside the groove, and a dust collecting hood for sucking and removing fumes and molten iron.

As described above, according to the present embodiment, while a steel strip is advanced at a high speed of 2 m/s or more, a magnetic domain refining process is stably performed by a laser, thus improvement rates of iron loss before and after heat treatment of the electrical steel strip may be ensured by 5% or more and 10% or more, respectively.

In addition, it is possible to accurately measure the presence or absence of a defect in real time by detecting a state of a finely formed groove on a surface of a steel strip in a state in which the steel strip is continuously moved according to a continuous magnetic domain refining process, and thus, when defective machining occurs, it is immediately reflected in equipment, so that it is possible to minimize production of defective products by repairing a defective refinement groove or stopping progress of the process.

It is possible to accurately detect whether or not a groove formed in a steel strip in a width direction is defective and accurately check a position of an optical system of equipment where the defect has occurred, and the defect may be solved more easily and promptly through selective supplementary maintenance.

It is possible to shorten a time required for initial setting of equipment, thereby maximizing productivity.

In addition, it is possible to increase magnetic domain refining efficiency and improve workability, thereby increasing magnetic domain refining processing capability.

Further, it is possible to more effectively remove contaminants such as hill-up and spatter formed by laser irradiation, thereby improving quality of a product.

Furthermore, it is possible to mass-produce high-quality products by providing an optimum operation environment required for a process.

MODE FOR INVENTION

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other specific features, regions, numbers, operations, elements, components, and/or groups may exist or may be added.

The present invention will be described more fully hereinafter with reference to the accompanying drawings, in which embodiments of the invention are shown. As understood by those skilled in the art, the following embodiment may be modified in various ways without departing from the concept and scope of the present invention. As those skilled in the art would realize, the described embodiments may be modified in various different ways, all without departing from the spirit or scope of the present invention.

In the following description of the present embodiment, equipment for permanently refining magnetic domains of a grain-oriented electrical steel strip used as an iron core material of a transformer will be exemplarily described.

Figure 1:
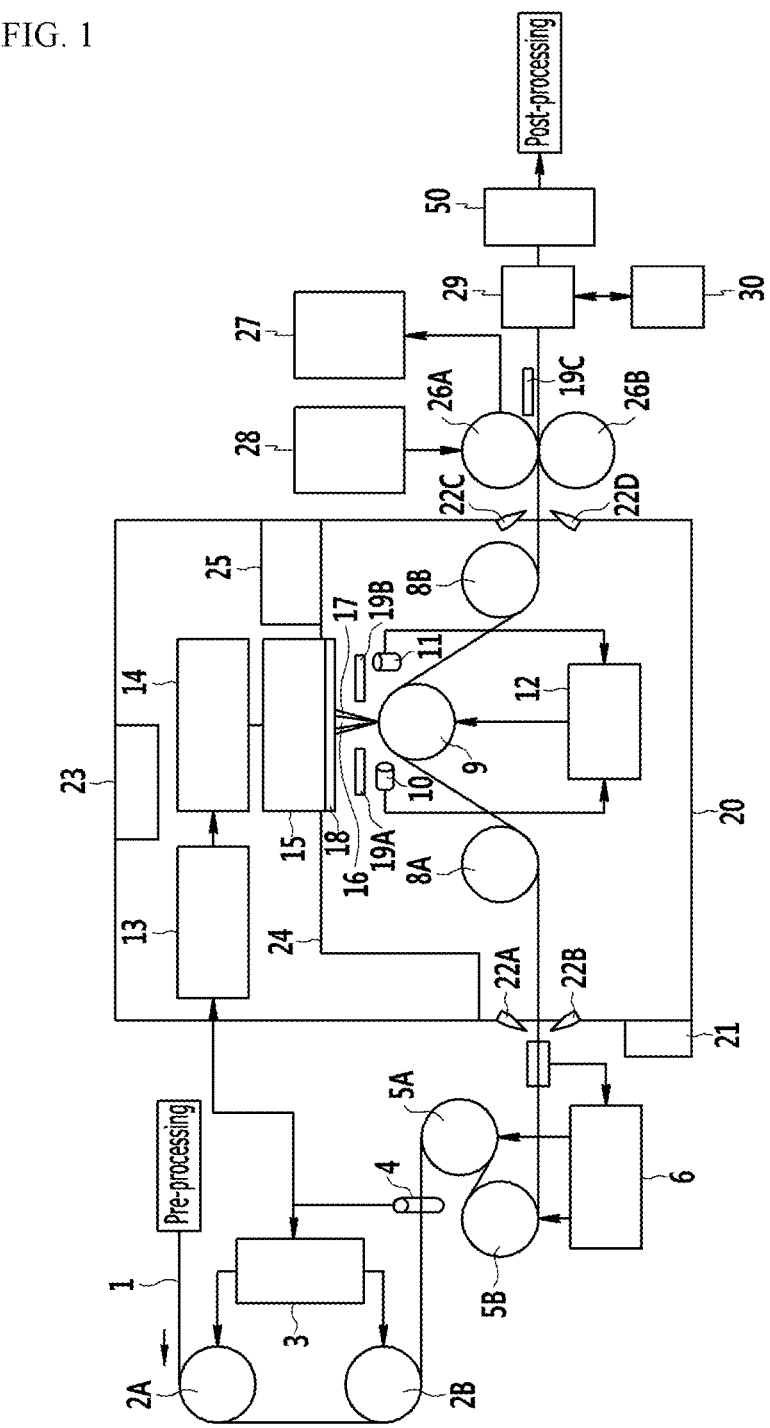
FIG. 1 illustrates a schematic view of a magnetic domain refining apparatus of a grain-oriented electrical steel strip according to an embodiment of the present invention.
Figure 2:
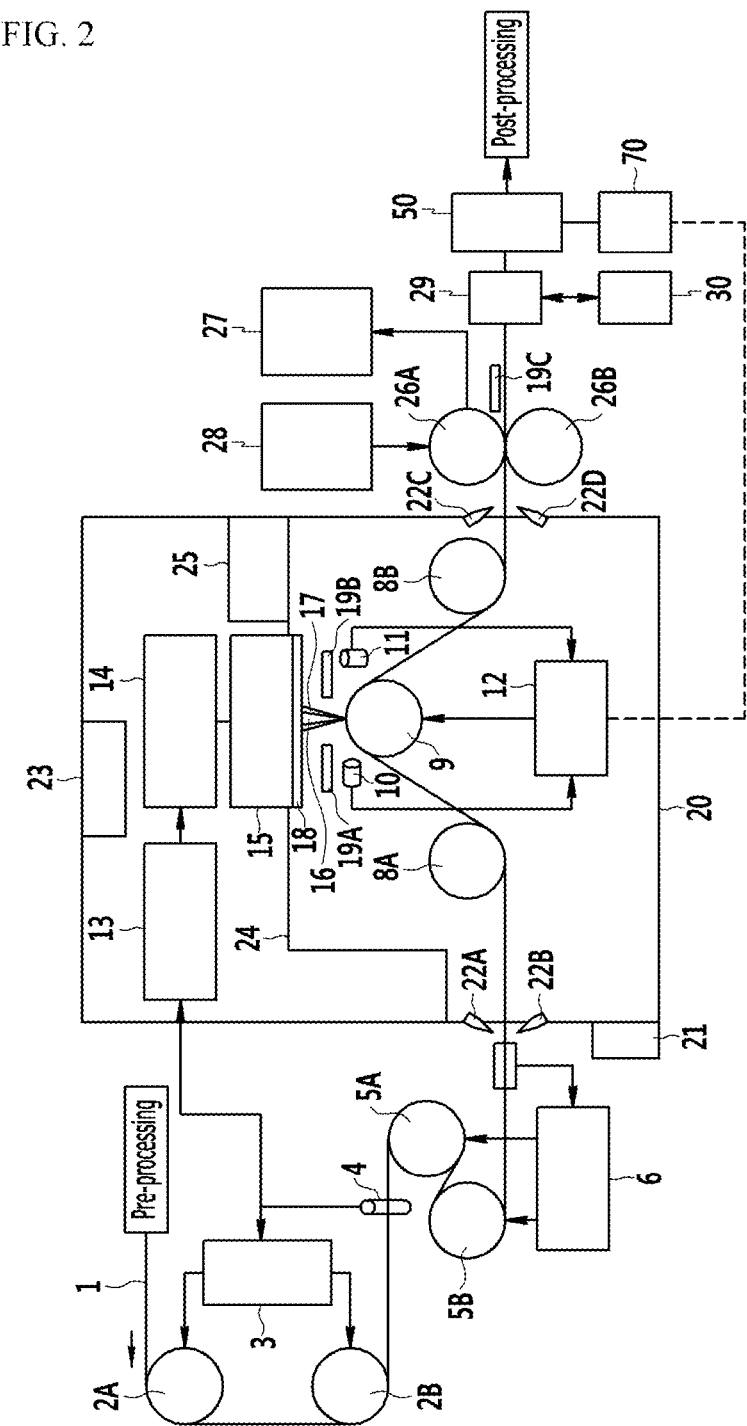
FIG. 2 illustrates a schematic view of a magnetic domain refining apparatus of a grain-oriented electrical steel strip according to another embodiment of the present invention.
Figure 3:
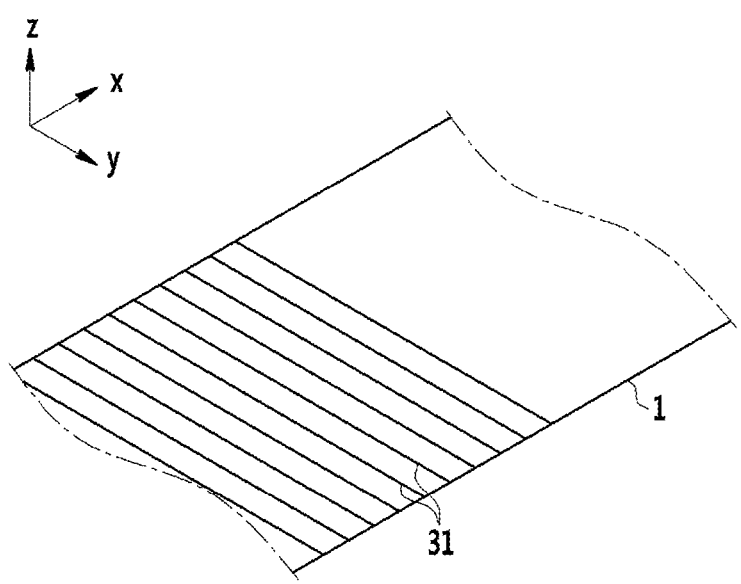
FIG. 3 illustrates a schematic view of a steel strip in which a magnetic domain refining process is performed according to an embodiment.

FIG. 1 and FIG. 2 schematically show embodiments of an apparatus for refining magnetic domains of a grain-oriented electrical steel strip, and FIG. 3 shows a steel strip subjected to a magnetic domain refining process according to the present embodiment. In the following description, a rolling direction or a steel strip moving direction means an x-axis direction in FIG. 3, and a width direction means a y-axis direction in FIG. 3, which is a direction perpendicular to the rolling direction, wherein the width means a length of the steel strip with respect to the y-axis direction. In FIG. 3, reference numeral 31 denotes an irradiation line that is continuously formed on a surface of a steel strip 1 by being dug in a groove shape by a laser beam.

Referring to FIG. 1, the apparatus for refining the magnetic domains of the grain-oriented electrical steel strip according to the present embodiment stably performs the permanent magnetic domain refining process even if the steel strip 1 advances at a high speed of 2 m/s or more.

The magnetic domain refining apparatus of the present embodiment includes steel strip supporting roll position adjusting equipment that supports the steel strip 1 that is moved along a production line while controlling a position of the steel strip in up and down directions, laser irradiating equipment that irradiates a laser beam on the steel strip to melt the steel strip to form a groove on the surface of the steel strip, and a detector 50 that detects whether or not the groove is defective by checking a state of the groove formed on the surface of the steel strip.

As shown in FIG. 1, the detector 50 is disposed at a rear side of the apparatus to detect the presence or absence of a defect by checking the state of the groove formed in a continuously advancing steel strip. The detector will be described later in detail.

The magnetic domain refining apparatus may further include a laser room 20 that isolates and accommodates the steel strip supporting roll position adjusting equipment and the laser irradiating equipment from the outside and that provides an operation environment for laser irradiation.

The magnetic domain refining apparatus may further include tension control equipment for applying tension to the steel strip so that the steel strip does not droop but spreads flat.

The magnetic domain refining apparatus may further include meandering control equipment that allows the steel strip to move along a center of the production line without being deviated left and right.

The magnetic domain refining apparatus may further include post-treatment equipment for removing hill-up and spatter formed on the surface of the steel strip according to the laser beam irradiation.

The hill-up refers to a portion where iron melted from the steel strip is accumulated on opposite sides of the groove portion at a predetermined height or more when the groove is formed by irradiating the surface of the steel strip with a laser beam. The spatter refers to molten iron that is generated during laser beam irradiation and solidified on the surface of the steel strip.

The meandering control equipment may include steering rolls 2A and 2B for switching a direction of movement of the steel strip 1, a meandering measuring sensor 4 for measuring a degree (meandering amount) of deviation of a central position of a width of the steel strip 1 from the center of the production line, and a strip center position control system 3 for calculating a detection signal of the meandering measuring sensor 4 and adjusting a direction in which the steel strip 1 moves by rotating and moving axes of the steering rolls 2A and 2B.

The meandering measuring sensor 4 is disposed at a rear side of the steering roll 2B to detect an actual meandering amount of the steel strip having passed through the steering roll in real time.

The steel strip is straightly moved along the center of the production line by the meandering control equipment without being deviated left or right, thus it is possible to form grooves on the surface of the steel strip over an entire width of the steel strip.

The meandering amount of the steel strip is measured by the meandering measuring sensor 4 of the meandering control equipment in a process before the groove is formed on the surface of the steel strip by laser irradiation. A value measured by the meandering measuring sensor 4 is outputted to the strip center position control system, and the strip center position control system calculates the output value of the meandering measuring sensor and rotates and moves the axes of the steering rolls 2A and 2B according to the calculated meandering value. As described above, the steering rolls 2A and 2B are rotated and moved, thus a moving direction of the steel strip wound around the steering roll is adjusted. Therefore, the meandering amount of the steel strip 1 may be controlled within +/−1 mm.

The tension control equipment may include tension bridle rolls (TBR) 5A and 5B for guiding movement of the steel strip 1 while applying a predetermined tension to the steel strip 1, a steel strip tension measuring sensor 7 for measuring the tension of the steel strip 1 passing through the tension bridge roll, and a strip tension control system 6 for adjusting a speed of the tension bridle rolls 5A and 5B according to the tension of the steel strip 1 measured by the steel strip tension measuring sensor 7.

The strip tension measuring sensor 7 is disposed at the rear side of the tension bridle roll 5B, and measures an actual tension of the steel strip to which the tension is applied by passing through the tension bridle roll 5B, in real time.

In the present embodiment, the tension of the steel strip may be set so that the surface of the steel strip at a laser irradiation position of the laser irradiating equipment is flattened and the steel strip is not broken due to excessive tension.

For manufacturing the steel strip to have the steel strip tension within a predetermined range, the tension control equipment controls a speed of the tension bridge rolls (TBR) 5A and 5B through the strip tension control system 6 according to the tension of the steel strip measured by the steel strip tension measuring sensor 7. Thus, the tension control equipment controls a tension error of the steel strip 1 to be within the set range to apply the tension to the steel strip.

The steel strip having passed through the tension control equipment is moved in the laser room 20, is processed with the magnetic domain refining process through the steel strip supporting roll position adjusting equipment and the laser irradiating equipment, and then exits to the outside of the laser room 20. The laser room will be described later.

In the present embodiment, a steel strip supporting roll 9 is disposed inside the laser room 20 immediately below the laser irradiating equipment, and deflector rolls 8A and 8B are respectively disposed at opposite sides of the steel strip supporting roll with the steel strip supporting roll therebetween.

The moving direction of the steel strip 1 is switched to be directed to the steel strip supporting roll 9 by the deflector rolls 8A and 8B. While the steel strip 1 passes the deflector roll 8A, the moving direction thereof is switched to be directed to the steel strip supporting roll 9, and then it passes the deflector roll 8B and is moved.

The steel strip 1 is wound in a form of an arc along the steel strip supporting roll 9 by the deflector roll, and moves while being in surface contact with the steel strip supporting roll. In order to minimize variation of a laser beam focal length due to a vibration and waves of the steel strip during the irradiation of the laser beam, the steel strip must sufficiently contact a surface of the steel strip supporting roll while being moved, and in this state, a laser beam must be irradiated to the steel strip moved along the steel strip supporting roll. In the present embodiment, since the steel strip is in surface contact with the steel strip supporting roll as described above, the laser beam may be accurately irradiated to the steel strip.

The steel strip supporting roll position adjusting equipment includes the steel strip supporting roll 9 for supporting the steel strip 1 in accordance with a laser irradiation position of the laser irradiating equipment, and a steel strip supporting roll (SPR) position control system 12 for controlling a position of the steel strip supporting roll 9.

The steel strip supporting roll position adjusting equipment supports the steel strip 1 with the steel strip supporting roll 9, and positions the steel strip 1 in a depth of focus with high laser irradiation efficiency to the steel strip. The steel strip supporting roll position adjusting equipment vertically adjusts the position of the steel strip supporting roll 9 as a whole so that the laser beam is focused on the steel strip 1.

The steel strip supporting roll position adjusting equipment may include a luminance measuring sensor 10 for measuring brightness of a flame generated when the laser irradiating equipment irradiates a laser to the steel strip 1.

The position of the steel strip supporting roll 9 is vertically adjusted as a whole so that brightness of the flame generated when the laser beam is irradiated to the steel strip is the best. The brightness of the flame generated when the steel strip is laser-irradiated may be measured by using the luminance measuring sensor 10.

A distance between a condenser mirror 35 for irradiating the laser beam and the steel strip 1 supported by the steel strip supporting roll 9 should coincide with a focal distance of the laser beam so that the laser beam may be accurately focused on the steel strip. By vertically adjusting a position of the condenser mirror 35 and a position of the steel strip supporting roll 9, the distance between the condenser mirror and the steel strip may be accurately adjusted to the focal distance. Thus, the steel strip is positioned in the depth of focus, and the focus of the laser beam is accurately formed on the steel strip, and thus the groove is deeply formed in the steel strip.

In the present embodiment, the steel strip supporting roll position adjusting equipment may further include a distance measuring sensor 11 for measuring an actual distance between an optical system of the laser irradiating equipment and the steel strip surface.

The steel strip supporting roll position control system 12 calculates the brightness of the flame detected by the luminance measuring sensor 10 and the distance between the optical system and the steel strip surface actually measured by the distance measuring sensor 11 to more accurately control the position of the steel strip supporting roll 9.

As shown in FIG. 2, the steel strip supporting roll position control system 12 may accurately control the position of the steel strip supporting roll 9 by controlling the steel strip supporting roll position adjusting equipment in accordance with a control signal of a corrector 70, which will be described later.

The meandering control equipment, the tension control equipment, and the steel strip supporting roll position adjusting equipment serve to produce a condition of the steel strip at the laser irradiation position so that the laser groove may be precisely formed by the laser irradiating equipment. A center position of the steel strip at the laser irradiation position should be at a center position of the production line, and the distance from the optical system thereto should be maintained at the set value.

The laser irradiating equipment may include a laser oscillator controller 13, a laser oscillator 14 for oscillating a continuous wave laser beam 16, and an optical system 15.

Figure 4:
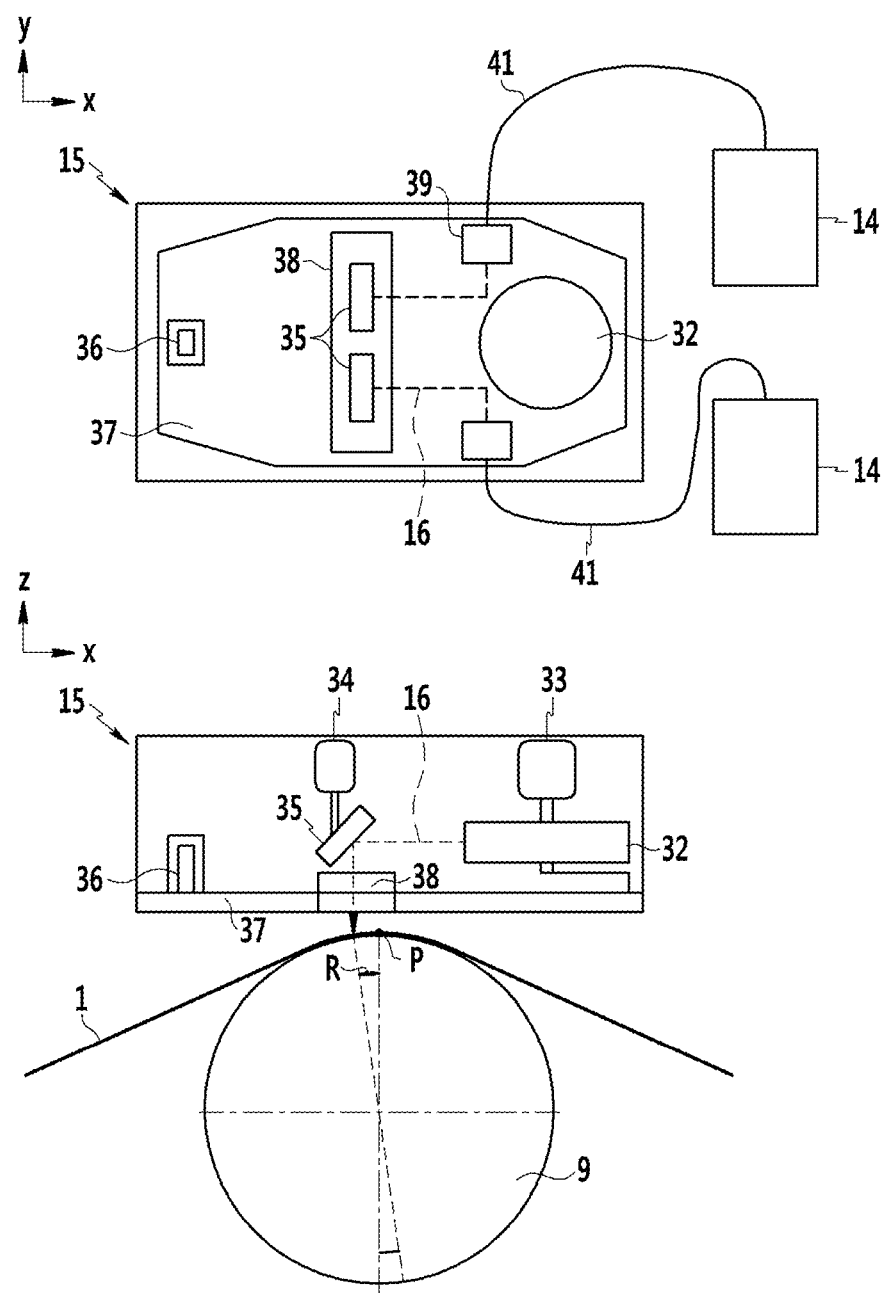
FIG. 4 illustrates a schematic view of a configuration of an optical system of laser irradiating equipment according to an embodiment.

As shown in FIG. 4, the optical system 15 may include a module plate 37 that is rotatably installed to form an angle of a laser beam irradiation line with respect to a width direction of the steel strip, a driver 36 for rotating the module plate 37, a header 39 installed at the module plate 37 and emitting a laser beam applied from the laser oscillator 14 to the inside of the optical system 15, a polygonal mirror 32 rotatably installed at the module plate 37 to reflect the laser beam emitted from the header 39, a rotation motor 33 for rotating the polygonal mirror 32, a condenser mirror 35 installed at the module plate 37 and reflecting the laser beam 16 reflected by the polygonal mirror 32 toward the steel strip to focus the laser beam 16 on the steel strip, a driving motor 34 connected to the condenser mirror 35 to adjust a focal distance of the laser beam by moving the condenser mirror 35, and a shutter 38 installed at the module plate 37 to selectively block the module plate 37 according to whether the laser beam is irradiated or not.

In the optical system 15, the header 39, the polygonal mirror 32, the condenser mirror 35, and the shutter are disposed in the module plate 37 forming an optical box to form a single body. The laser oscillator 14 and the header 39 are connected with, for example, an optical cable 41. Thus, the laser beam emitted from the laser oscillator 14 is transmitted to the header 39 through the optical cable 41. The header 39, the polygonal mirror 32, and the condenser mirror 35 are disposed at a predetermined position to reflect the laser beam 16 to a desired position inside the module plate 37 forming the optical box. As shown in FIG. 4, for example, the headers 39 may be disposed at opposite sides of the polygonal mirror 32 with the polygonal mirror 32 therebetween to respectively emit a laser beam toward the polygonal mirror 32. Two condenser mirrors 35 are disposed in accordance with the respective laser beams reflected by the polygonal mirror 32. The laser beam emitted from the header 39 is reflected by the polygonal mirror 32 that rotates in accordance with the driving of the rotation motor 33, and is sent to the condensing mirror 35. The laser beam 16 reflected by the condenser mirror 35 is reflected from the condenser mirror 35 to the steel strip through the shutter 38, and is condensed on the surface of the steel strip 1. Thus, the surface of the steel strip is periodically irradiated with the laser beam to form continuous grooves in the width direction thereof.

The entire focal distance of the laser beam 16 formed by the optical system 15 is adjusted by the vertical movement of the steel strip supporting roll 9, and unmatched right and left focal distances are adjusted by the driving motor 34 connected to the condensing mirror 35.

The shutter 38 is installed under the module plate 37 to open and close the module plate 37. When the laser beam is irradiated downward from the condensing mirror 35, the shutter 38 is opened to prevent interference with the laser beam, and when the laser beam is not irradiated, the shutter 38 is closed to block external fumes or foreign substances from entering the inside of the optical system 15.

When the steel strip meandering amount is excessive, the steel strip is deviated from the laser irradiation position, thus the steel strip supporting roll 9 is irradiated with a laser to cause damage. Therefore, in order to prevent damage to the steel strip supporting roll, the laser oscillator controller 13 turns on the laser oscillator in a normal working condition, and controls the laser oscillator to be off when the steel strip meandering amount is 15 mm or more.

The laser oscillator 14 may oscillate a single mode continuous wave laser beam and transmit it to the optical system 15. The optical system 15 irradiates the sent laser beam 16 onto the surface of the steel strip.

The laser oscillator 14 and the optical system 15 may irradiate the surface of the steel strip with a laser beam to form grooves having an upper width of 70 μm or less, a lower width of 10 μm or less, and a depth of 3 to 30 μm, and simultaneously, they may transmit a laser energy density within a range of 1.0 to 5.0 J/mm$^2$ to the steel strip required for melting the steel strip so as to produce a re-solidified portion remaining on an inner wall surface of a groove of a molten portion during laser irradiation.

The optical system 15 has a function of controlling a laser scanning speed so that an interval of the laser irradiation lines (reference number 31 of FIG. 3) may be adjusted to 2 to 30 mm in a rolling direction. Thus, an influence of a heat affected zone (HAZ) by the laser beam may be minimized, thereby improving the iron loss of the steel strip.

In addition, the laser irradiating equipment may have a structure in which an angle of the irradiation line of the laser beam irradiated on the surface of the steel strip is varied with respect to the width direction of the steel strip. In the present embodiment, the laser irradiating equipment may adjust the angle of the irradiation line of the laser beam with respect to the width direction of the steel strip in a range of ±4°.

For this purpose, since the laser irradiating equipment has a structure in which the optical system 15 for irradiating the laser beam on the steel strip by the driver 36 may be rotated, and it may variously change the angle of the irradiation line of the laser beam irradiated on the surface of the steel strip with respect to the width direction of the steel strip. As the angle of the irradiation line of the laser beam by the optical system is changed, the irradiation line 31 by the laser beam is inclined in a range of ±4° degrees with respect to the direction perpendicular to the rolling direction of the steel strip. Therefore, it is possible to minimize the decrease in the magnetic flux density due to the groove formation by the laser.

In addition, in the present embodiment, the laser irradiating equipment controls an irradiation position of the laser beam on the steel strip 1 to prevent a back reflection phenomenon in which the laser beam irradiated on the steel strip is reflected by the steel strip and inputted to the optical system or the laser oscillator.

For this, as shown in FIG. 4, with respect to the surface of the steel strip that progresses while contacting the surface of the steel strip supporting roll 9 in an arc form, a laser beam irradiation position when an irradiation direction of the laser beam irradiated by the optical system 15 passes a central axis of the steel strip supporting roll 9 is set as a reference point P, and the laser irradiating equipment may irradiate the laser beam from the reference point P to a position spaced at a predetermined angle (hereinafter referred to as a spacing angle R for convenience of explanation) from the center of the steel strip supporting roll 9 along an outer peripheral surface.

The reference point P is a point at which a line passing through the central axis of the steel strip supporting roll 9 meets the steel strip in FIG. 4. When the irradiation direction of the laser beam passes the central axis of the steel strip supporting roll 9, a focal point of the laser beam is fitted to the reference point P. In this case, as the irradiation direction of the laser beam is orthogonal to a tangent of the steel strip supporting roll 9 at the reference point P, a back reflection phenomenon occurs in which the laser beam reflected by the steel strip is inputted to the optical system and the laser oscillator as it is and damages them.

As described above, the laser irradiating equipment according to the present embodiment irradiates the laser beam to a position spaced apart from the reference point P by the spacing angle R, so that the laser beam reflected back from the steel strip is not incident on the optical system. Therefore, the above-described back reflection phenomenon may be prevented and the shape quality of the groove formed by the laser beam may be maintained.

In the present embodiment, the spacing angle R may be set in a range of 3 to 7 degrees along the outer peripheral surface at the center of the steel strip supporting roll 9 with respect to the reference point P.

When the spacing angle R, which is an angle at which the laser beam is irradiated, is smaller than 3 degrees, some of the laser beam reflected back from the steel strip may be inputted into the optical system or the laser oscillator. When the spacing angle R exceeds 7 degrees, the groove may not be properly formed by the laser, and the formed groove may be defective.

As described above, the laser irradiating equipment according to the present embodiment prevents the back reflection phenomenon by irradiating the steel strip with the laser beam at a position spaced by a predetermined angle based on the reference point P, and does not interfere with an incident light path during the laser beam reflection, so that it is possible to stably maintain the shape quality of the groove formed by the laser beam.

The laser irradiating equipment may further include molten iron removing equipment for removing the fumes and spatter generated by the laser beam irradiation on the steel strip.

The molten iron removing equipment may include an air knife 17 for spraying compressed dry air into the groove of the steel strip to remove molten iron remaining inside the groove, and dust collecting hoods 19A and 19B for sucking and removing fumes and molten iron. The fumes generated during the laser irradiation are removed through the air knife and the dust collecting hood, thereby preventing the fumes from being introduced into the optical system. The air knife 17 ejects compressed dry air having a predetermined pressure Pa into the groove of the steel strip 1 to remove the molten iron remaining inside the groove. It is preferable that the compressed dry air of the air knife 17 has a pressure Pa of 0.2 kg/cm$^2$ or more. This is because it is impossible to remove the molten iron inside the groove such that an iron loss improving effect may not be secured when the pressure of the compressed dry air is smaller than 0.2 kg/cm$^2$. The fumes and spatter removed by the air knife are removed by the dust collecting hoods 19A and 19B disposed before and after the laser irradiation position.

The laser irradiating equipment may further include a shielding portion 18 for blocking reflected light, scattered light, and radiant heat of the laser beam from being introduced into the optical system. The shielding portion 18 blocks the reflected light and the scattered light introduced into the optical system by the reflecting and scattering of the laser beam 16 irradiated on the steel strip, thereby preventing the optical system from being heated and thermally deformed by the radiant heat due to the reflected light and scattered light.

The laser room 20 is a room structure having an internal space, and the laser irradiating equipment and the steel strip supporting roll 9 position control equipment are accommodated inside of the laser room 20 so as to isolate the equipment from the outside, and the laser room 20 provides an appropriate operation environment for smoothly driving the equipment.

An entrance and an exit of the laser room 20 are formed at entrance and exit sides of the laser room 20 along a progression direction of the steel strip. The laser room 20 is provided with equipment for blocking contaminants from being introduced so that an internal space thereof is not contaminated by external dust or the like. To this end, the laser room 20 is provided with a positive pressure device 23 for increasing an internal pressure beyond an external pressure. The positive pressure device 23 maintains the internal pressure of the laser room 20 to be relatively higher than the external pressure. Thus, it is possible to prevent a foreign substance from being introduced into the laser room 20. In addition, air curtains 22A, 22B, 22C, and 22D are provided at the entrance and exit to and from which the steel strip enters and exits. The air curtains eject air to the entrance and the exit, which are passages through which the steel strip enters to and exits from the laser room 20, to form a curtain, thereby blocking dust and the like from being introduced through the entrance and the exit. In order to prevent contamination of the inside of the laser room 20, a shower booth 21 may be provided at a door, which is an entrance of the laser room 20. The shower booth 21 removes foreign materials adhering to a body of a user entering the laser room 20.

The laser room 20 is a space in which the steel strip magnetic domain refining process proceeds by the laser beam, and it is necessary to minimize change of an internal environment thereof and maintain a proper environment. To this end, the laser room 20 includes an optical system lower frame 24 for separating an upper space where the laser oscillator 14 of the laser irradiating equipment and the optical system 15 are disposed from a lower space through which the steel strip 1 passes, and a constant temperature and humidity controller 25 for controlling an internal temperature and humidity of the laser room 20.

The optical system lower frame 24 makes it possible to more thoroughly manage an operation environment of major equipment such as the laser oscillator 14 and the optical system 15. The optical system lower frame 24 is installed in the laser room 20 so as to separate the lower space of the optical system through which the steel strip passes, and the upper space of the optical system where the laser oscillator and the optical system mirrors are disposed. The upper space of the optical system is isolated from the inside of the laser room 20 by the optical system lower frame 24, so that it is possible to easily prevent the contamination of major equipment such as the laser oscillator and the optical system and easily control the temperature and humidity thereof.

The constant temperature and humidity controller 25 adjusts the temperature and humidity inside the laser room 20 to provide a proper environment. In the present embodiment, the constant temperature and humidity controller 25 may maintain the internal temperature of the laser room 20 at 20 to 25 degrees and maintain the humidity at 50% or less.

As described above, the internal space of the laser room 20 is maintained at a temperature and a humidity suitable for a working environment, and the magnetic domain refining process may be performed for the steel strip in an optimum state. Therefore, it is possible to mass-produce high-quality products in an optimum operation environment required for a process.

The magnetic domain refining apparatus of the present embodiment may further include post-treatment equipment for removing the hill-up and spatter formed on the surface of the steel strip.

Since the hill-up and spatter cause deterioration of insulation and viscosity of the product, the quality of the product may be improved by completely removing the hill-up and spatter through the post-treatment equipment.

The post-treatment equipment may include brush rolls 26A and 26B that are disposed at a rear side of the laser room 20 along a steel strip moving direction to remove the hill-up and spatters of the steel strip surface. The brush rolls 26A and 26B are rotated at a high speed by a driving motor, and the rotation speed of the brush roll and an interval between the brush roll and the steel strip are controlled by a current control system for controlling a current value of the driving motor outputted during operation to a set target value and a brush position control system for controlling the interval between the brush roll and the steel strip. The brush roll may be disposed on only one surface of the steel strip having grooves formed by the laser beam, or on both surfaces of the steel strip. The brush rolls 26A and 26B closely contact the surface of the steel strip and rotate at a high speed to remove the hill-up and spatter attached to the surface of the steel strip. As shown in FIG. 1, a dust-collecting hood 19C for discharging the hill-up and spatter removed by the brush roll is further provided to be close to the brush rolls 26A and 26B. The dust-collecting hood 19C sucks the molten iron such as the hill-up and spatter, which are separated from the steel strip by the brush rolls 26A and 26B, and discharges the molten iron to the outside.

The post-treatment equipment includes a cleaning unit 29 that is disposed at a rear side of the brush rolls 26A and 26B and electrolytically reacts the steel strip with an alkali solution to further remove the hill-up and spatter remaining on the surface of the steel strip, and a filtering portion 30 that is coupled to the cleaning unit 29 and filters a foreign material contained in the alkali solution of the cleaning unit from the alkali solution.

The hill-up and spatter of the steel strip is removed through the brush rolls 26A and 26B, and the remaining hill-up and spatter is secondarily removed through the cleaning unit 29. Therefore, it is possible to more completely remove the hill-up and spatter attached to the surface of the steel strip, thereby enhancing the product quality.

The cleaning unit 29 is filled with an alkali solution, and the filtering portion 30 is connected to one side thereof. As the steel strip is processed through the cleaning unit, the hill-up and spatter removed from the steel strip are accumulated in the alkali solution of the cleaning unit, thus cleaning performance of the steel strip is degraded. The filtering portion 30 circulates the alkali solution of the cleaning unit and removes the hill-up and spatter contained in the alkali solution. The filtering portion 30 removes the hill-up and spatter to control an iron content of the alkali solution to 500 ppm or less. As such, by preventing the performance of the cleaning unit from being degraded, it is possible to continuously process the steel strip.

Figure 5:
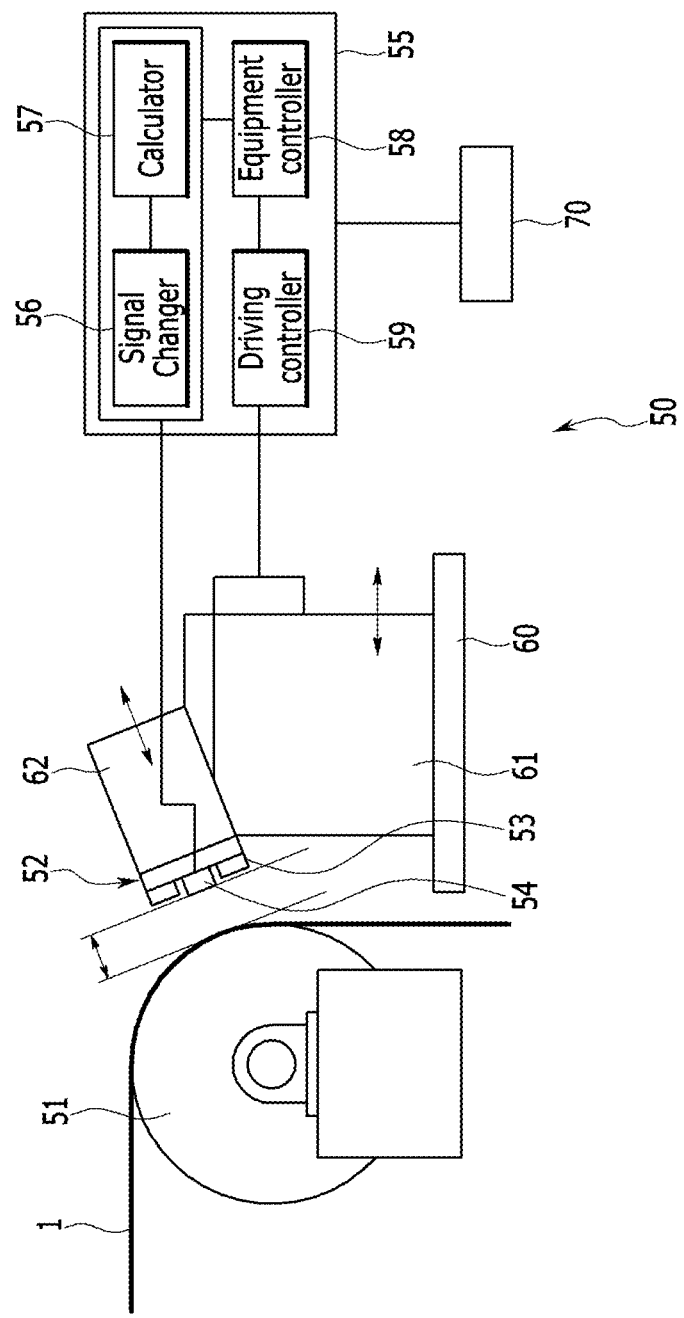
FIG. 5 illustrates a schematic view of a detector of an apparatus for refining magnetic domains of a grain-oriented electrical steel strip according to an embodiment.

FIG. 5 illustrates a detector 50 provided at a rear side of the apparatus according to the present embodiment.

The detector 50 is disposed at a rear side of the post-treatment equipment, and finally detects presence or absence of a defect by monitoring a processing state of the groove 31 formed on the surface of the steel strip 1.

As shown in FIG. 5, the detector 50 calculates a non-conductive roll 51 for supporting a moving steel strip, a leakage magnetic flux measurer 52 including a magnetizer 53 and a magnetic sensor 54, and a controller 55 for confirming whether the groove is defective or not by calculating an output signal of the magnetic sensor 54.

The magnetizer 53 applies a magnetic force to the surface of the steel strip passing through the non-conductive roll 51 to magnetize the steel strip, and the magnetic sensor 54 is disposed to be separated from the steel strip to measure a leakage magnetic field of the groove formed in the steel strip.

The non-conductive roll 51 is a roll made of a non-conductive material that does not conduct electricity. The non-conductive roll 51 stably supports the steel strip against the leakage magnetic flux measurer 52 while contacting the steel strip with a sufficient area. The steel strip may be advanced while contacting a surface of the non-conductive roll 51 in a form of an arc.

The leakage magnetic flux measurer 52 measures a magnetic field leaking from a discontinuous portion of the surface of the steel strip, that is, the groove, by using magnetic flux leakage.

To this end, the leakage magnetic flux measurer 52 includes the magnetizer 53 that applies a magnetic field to the surface of the steel strip to magnetize it, and the magnetic sensor 54 that measures a magnetic field leaked from the groove, which is a discontinuous portion of the steel strip magnetized by the magnetizer 53.

One or more of the magnetizer 53 and the magnetic sensor 54 may be arranged along a width direction of the surface of the steel strip on the surface of the steel strip. Thus, the leakage magnetic flux measurer 52 may measure a size of the groove, for example, a depth and width of the groove, with respect to an entire length of the groove formed in the width direction of the steel strip. In addition, since the steel strip continuously passes through the leakage magnetic flux measurer 52, the leak magnetic flux measurer 52 may detect an interval between the grooves formed on the surface of the steel strip.

Figure 6:
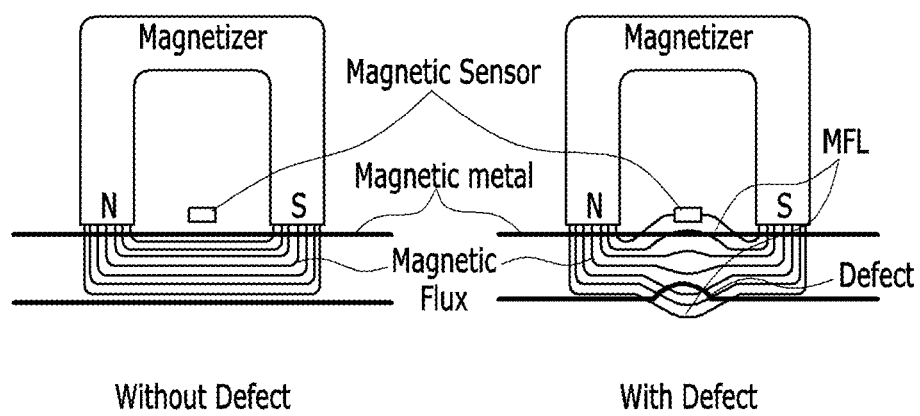
FIG. 6 is a drawing for explaining an operation of a detector according to an embodiment.

FIG. 6 illustrates a principle of measurement by the leakage magnetic flux measurer.

As shown in FIG. 6, the magnetizer magnetizes an object to be measured by applying a magnetic field to a surface of the object to be measured, which is a magnetic metal. A magnetic leak occurs at a discontinuous portion such as a groove, an eroded area, a crack, and the like formed on the surface of the object to be measured, and the magnetic leak is measured by the magnetic sensor which is spaced away from the object to be measured. Therefore, by analyzing the measured magnetic leak, it is possible to confirm a size and the like of the discontinuous portion formed on the object to be measured.

According to this principle, the leakage magnetic flux measurer 52 of the present embodiment may accurately detect the magnetic leak at the groove formed on the surface of the steel strip, which is a ferromagnetic body, in a state in which the steel strip 1 is continuously progressed.

The controller 55 calculates a magnetic leak signal detected by the leakage magnetic flux measurer 52 to detect whether the groove is defective.

In the present embodiment, the controller 55 includes a signal changer 56 for changing the magnetic leak signal detected by the magnetic sensor 54 into a depth signal of the groove, and a calculator 57 for comparing and calculating a reference value of a preset normal groove size and an actual value of the groove size outputted from the signal changer 56 and determining presence or absence of a defect.

A signal applied from the magnetic sensor 54 is a value of the magnetic leak, and the signal changer 56 converts the signal applied from the magnetic sensor 54 into a groove size value. The actual value of the size of the groove is obtained through the signal changer 56.

The calculator 57 stores the reference value of the preset normal groove size as data therein. The calculator 57 is connected to the signal changer 56, and compares and calculates the actual value of the groove size applied from the signal changer 56 and the reference value of the groove size stored therein to determine the presence or absence of a defect. That is, when the actual value of the groove size is similar to the reference value of the groove size, the calculator 57 may determine a normal state, and when the actual value of the groove size is greatly different from the reference value of the groove size, it may determine that there is a defect.

The calculator 57 also stores a reference value of an interval between grooves of a normal state as data therein. The calculator 57 may determine the presence or absence of a defect by comparing and calculating an actual value of the interval between the grooves determined through the signal applied from the signal changer 56 and the reference value of the interval between the grooves stored therein.

In addition, since the calculator 57 detects the presence or absence of a defect in the groove with respect to the entire groove length along the width direction of the steel strip, it is possible to more specifically check a defective position in the defective groove. A plurality of necessary elements such as a condensing mirror for irradiating the laser beam along the width length of the steel strip may be arranged along the width direction of the steel strip. By detecting the defective position of the groove, it is possible to accurately confirm whether there is a problem in any of the plurality of constituent elements arranged along the width direction of the steel strip. Therefore, it is possible to selectively perform supplemental measures such as maintenance on the corresponding constituent elements.

As described above, the detector 50 may monitor the machining state of the groove formed on the surface of the actual steel strip in the process of forming the magnetic domain refined groove on the steel strip to confirm whether or not the groove is defective, thereby immediately reflecting the confirmed result to the equipment such that a necessary measurement may be performed.

The controller 55 may further include an equipment controller 58 for controlling an operation of equipment according to an output signal of the calculator 57.

The equipment controller 58 controls an operation of the apparatus by applying control signals to the respective constituent elements configuring the steel strip magnetic domain refining apparatus according to the output signal of the calculator 57. For example, the equipment controller 58 may stop the movement of the steel strip by controlling the driver that moves the steel strip along the line, or stop the laser groove processing by controlling the operation of the laser irradiating equipment. Thus, when a defect occurs in the groove formed in the steel strip, the work is immediately stopped in accordance with a signal of the equipment controller 58, so that it is possible to prevent a defective steel strip from being manufactured.

As shown in FIG. 5, the detector 50 may further include a driver for adjusting the interval between the leakage magnetic flux measurer 52 and the steel strip, if necessary. The detector 50 needs to adjust the interval between the leakage magnetic flux measurer 52 and the steel strip in accordance with various work environments such as maintenance of the leakage magnetic flux measurer 52, waiting for operation, and adjustment of the measurement distance between the magnetic sensor 54 and the steel strip depending on the type of steel strip.

In the present embodiment, the driver includes a rail 60 installed on the equipment toward a steel strip, a moving carriage 61 moved along the rail 60, and a movable frame 62 that is movably installed on the moving carriage 61 and including a front side at which the leakage magnetic flux measurer 52 is provided.

The controller 55 may further include a driving controller 59 that is connected to the driver and controls and operates the driver according to an output signal of the equipment controller 58.

Accordingly, when the moving carriage 61 is moved along the rail 60, the moving frame 62 provided with the leakage magnetic flux measurer 52 is moved back and forth toward the steel strip, and the moving frame 62 is moved with respect to the moving carriage 61, thus the interval between the leakage magnetic flux measurer 52 installed in the moving frame 62 and the steel strip is accurately adjusted.

The movement of the moving carriage 61 and the moving frame 62 may be performed by using, for example, a driving force of a driving cylinder, a step motor, or the like, and may be variously set.

The driving controller 59 applies a control signal to the moving carriage 61 and the moving frame 62 in accordance with the output signal of the equipment controller 58 so that the leakage magnetic flux measurer 52 is moved closer to or farther away from the steel strip. For example, when coil information is transmitted to the controller 55 from a central operating room, the equipment controller 58 of the controller 55 applies a control signal to the driving controller 59 in accordance with the coil information to match an appropriate spacing distance between the magnetic sensor 54 of the leakage flux measurer 52 and the steel strip. The driving controller 59 drives the moving carriage 61 and the moving frame 62 in accordance with a signal applied from the equipment controller 58 to position the magnetic sensor 54 of the leakage magnetic flux measurer 52 on the surface of the steel strip.

The present embodiment may further include a corrector 70 for adjusting the laser beam focal position on the steel strip according to the result measured by the detector.

The corrector 70 is connected to the controller 55 of the detector 50, and adjusts the laser beam focal position on the steel strip according to the measurement result of the detector. Thus, the formation defect of the groove is corrected while the depth of the groove formed in the steel strip is deepened. The corrector 70 may move the steel strip with respect to a fixed laser beam focal position or move the focal position of the laser beam with respect to a fixed steel strip.

In the present embodiment, the corrector 70 may have a structure for adjusting the position of the steel strip supporting roll 9 up and down to focus the position of the steel strip 1. In addition to this structure, when the focal position is moved, the focal position of the laser beam may be adjusted by moving the position of the condensing mirror up and down for irradiating the laser with the steel strip supporting roll positioned correctly. In the both structures, the focal positions of the steel strip and the laser beam are relatively variable, and the focus of the laser beam is accurately formed on the surface of the steel strip.

As the positions of the steel strip supporting roll 9 or the condensing mirror 35 are adjusted up and down by the corrector 70, the distance between the condensing mirror and the steel strip is matched with the focal length of the laser beam. Thus, while the steel strip is positioned in the depth of focus of the laser beam, the focus may be accurately formed on the steel strip. Therefore, the grooves are normally and deeply formed in the steel strip, so that the defective formation of the grooves is corrected.

In the present embodiment, the corrector 70 is connected to the steel strip supporting roll position control system 12 to apply an output signal to the steel strip supporting roll position control system 12 according to a signal from the controller 55. Thus, the controller 55 applies the control signal to the corrector 70 when a groove defect occurs, and the corrector 70 controls the steel strip supporting roll position control system in accordance with the control signal of the controller to move the position of the steel strip supporting roll 9 up and down.

As the position of the steel strip supporting roll 9 is moved up and down, the position of the steel strip 1 is adjusted, and as the laser beam is focused on the steel strip, the defective formation of the groove depth with respect to the steel strip is corrected.

Hereinafter, a magnetic domain refining process of the electric steel strip according to the present embodiment will be described.

A continuously moving steel strip is passed through the meandering control equipment and the tension control equipment, enter the laser room, and proceed at a speed of 2 m/s or more in the laser room, so that a magnetic domain refining process is performed. The magnetic domain of the steel strip entering the inside of the laser room is refined through the laser irradiating equipment, and then the steel strip is drawn out of the laser room. The steel strip drawn to the outside of the laser room is passed through the post-treatment equipment such that the hill-up and spatter remaining on the surface thereof are removed, and then it is sent to a post-process.

In this process, the laser room in which laser irradiation is performed on the surface of the steel strip appropriately sets and maintains an internal operating environment so as to provide an optimum environment for refining the magnetic domain.

The inside of the laser room is isolated from the outside to block the external contaminants from inflowing therein, and the internal temperature, pressure, and humidity of the laser room are controlled to be suitable for the operating environment for refining the magnetic domain.

The inner pressure of the laser room is set and maintained to be higher than the external pressure, so that a foreign material such as dust may be prevented from entering into the laser room. In addition, by forming an air film at the entrance and the exit, which are passages through which the steel strip is moved, the foreign material such as dust may be prevented from flowing into the laser room while the steel strip proceeds through the entrance and exit.

The constant temperature and humidity controller installed in the laser room maintains the temperature in the laser room at 20 to 25 degrees and maintains the humidity at 50% or less, thereby providing an optimal condition for the magnetic domain refining process by laser irradiation.

As such, the laser room provides the optimal environment for the laser beam irradiation, and the steel strip is accurately positioned at the laser irradiation position through the meandering control equipment, the tension control equipment, and the steel strip supporting roll position adjustment equipment.

For refining the magnetic domain, a proceeding direction of the steel strip is first controlled through the meandering control equipment, and the steel strip moves straight along the center of the production line without deviating left or right.

The meandering measuring sensor continuously detects the meandering amount of the steel strip, and when the steel strip meanders, the signal detected by the meandering measuring sensor is calculated, and the steel strip central position control system rotates and moves the shaft of the steering roll to move the steel strip to the correct position. By continuously controlling the steering roll according to the position of the steel strip, the steel strip may be continuously moved without deviating from the center of the production line.

The steel strip passes through the steering roll, and then moves through a tension bridle roll for controlling the tension thereof. The tension of the steel strip through the bridle roll is detected by the tension measuring sensor. The steel strip tension control system calculates the measured value detected by the tension measuring sensor and controls the speed of the tension bridle roll to be suitable for a set tension. Thus, the tension of the moving steel strip may be continuously maintained to be suitable for a set range.

The steel strip through the tensile bridle roll enters the inside of the laser room through the entrance of the laser room. The steel strip is turned in the inside of the laser room by the bridle roll, and is moved in a state of being in close contact with the steel strip supporting roll positioned between the two bridle rolls.

The steel strip supporting roll moves the steel strip up and down to position the steel strip in the depth of focus of the laser beam.

When the laser beam is irradiated from the laser irradiating equipment to the steel strip, a luminance measuring sensor detects the brightness of the flame on the steel strip surface in real time. The steel strip supporting roll position control system moves the steel strip supporting roll up and down according to the measured value detected by the luminance measuring sensor so that the steel strip is positioned within the depth of focus of the laser beam. Thus, the surface of the steel strip is effectively irradiated with the laser beam, and a high quality irradiation line may be formed thereon.

The steel strip supporting roll position control system moves the steel strip supporting roll up and down according to the control of the corrector 70 so that the steel strip is positioned within the depth of focus of the laser beam. Thus, the surface of the steel strip is effectively irradiated with the laser beam, and high quality irradiation line may be formed thereon.

The laser oscillator controller turns the laser oscillator on/off according to a meandering degree of the steel strip. The laser oscillator controller is connected to the meandering measuring sensor, and determines that the steel strip deviates too much from the steel strip supporting roll when the meandering amount of the steel strip measured by the meandering measuring sensor is, for example, 15 mm or more, and turns off the laser oscillator. Thus, it is possible to irradiate the laser beam to the surface of the steel strip supporting roll after passing the meandered steel strip, thereby preventing the roll from being damaged.

The laser beam generated by the laser oscillator is irradiated onto the surface of the steel strip through the optical system in response to the command from the laser oscillator controller. The laser oscillator oscillates a $TEM_{00}$ continuous wave laser beam and transmits it to the optical system.

The optical system changes the direction of the laser beam and irradiates the surface of the steel strip with the laser, thereby continuously forming a molten groove on the surface of the steel strip to refine the magnetic domain.

While the surface of the steel strip is melted by the laser beam irradiated to the steel strip through the optical system, the melted groove is formed along the irradiation line. In the present embodiment, the laser oscillator and the optical system transmit the laser energy density within the range of 1.0 to 5.0 $J/mm^2$ necessary for melting the steel strip to the steel strip so that the groove having an upper width of 70 μm or less, a lower width of 10 μm or less, and a depth of 3 to 30 μm is formed on the surface of the steel strip through the laser beam irradiation, and simultaneously, a re-solidified portion which remains on an inner wall surface of the groove of the molten portion during the laser irradiation is generated.

In addition, by irradiating the laser beam at a position spaced apart from the reference point in the laser beam irradiation process through the optical system, the laser beam reflected back from the steel strip is not incident on the optical system. Therefore, the above-described back reflection phenomenon may be prevented, and the incident light path of the laser beam is not interfered with by the reflected light, so that the quality of the groove formed by the laser beam may be maintained.

The optical system has a function of controlling a laser scanning speed so that the interval between the laser irradiation lines with respect to the rolling direction may be adjusted. In addition, the optical system may have a rotation function to change the angle of the laser irradiation line. In the present embodiment, the interval between the laser irradiation lines may be adjusted to 2 to 30 mm in the rolling direction by the optical system, so that the influence of the heat affected zone (HAZ) by the laser beam may be minimized, thereby improving the iron loss of the steel strip. Further, in the laser beam irradiation process, the angle of the irradiation line of the laser beam irradiated on the surface of the steel strip may be changed through the rotation of the optical system. In the present embodiment, the optical system may change the angle of the irradiation line of the laser beam to a range of ±4 degrees with respect to the width direction of the steel strip. In other words, the irradiation line 31 of the laser beam may be formed so as to be inclined in the range of ±4 degrees with respect to the y-axis direction in FIG. 3. Therefore, the irradiation line formed on the surface of the steel strip may be formed to be inclined in the range of 86 to 94 degrees with respect to the rolling direction. As described above, by forming the irradiation line inclined with respect to the y-axis direction, it is possible to minimize the decrease in the magnetic flux density due to the formation of the groove by the laser.

In the laser beam irradiation process, the steel strip is melted by the laser beam, and a large amount of fumes and molten iron spatter are generated. The fumes and spatter contaminate the optical system, and when the molten iron remains in the groove, it is difficult to form a precise groove, and since the iron loss is not improved, the product quality is deteriorated. Thus, the compressed dry air is sprayed into the groove of the steel strip to remove the residual molten iron in the groove, and the fumes and molten iron are immediately sucked through the dust collecting hood to be removed. Accordingly, it is possible to block the fumes from flowing into the optical system in the process of refining the magnetic domain of the steel strip, and to rapidly remove the fumes and the spatter, thereby improving the efficiency of the magnetic domain refining process. In addition, it is possible to further block the scattered light and the heat of the laser beam from being introduced into the optical system of the laser irradiating equipment in the laser beam irradiation process.

While the groove is formed on the surface of the steel strip through the laser beam irradiation, the magnetic domain is refined, and the magnetic domain refined steel strip is continuously moved and discharged to the outside through the exit of the laser room.

The steel strip discharged from the laser room is subjected to the post-treatment process to remove the hill-up and spatter attached to the surface of the steel strip.

While the steel strip is firstly passed through the brush roll disposed outside the laser room, the hill-up and spatter are removed by the brush roll which closely contacts the steel strip and rotates at a high speed.

While the steel strip through the brush roll is secondly passed through the cleaning unit, the remaining hill-up and spatter is finally removed through the electrolysis reaction between the steel strip and the alkali solution. While the steel strip from which the hill-up and spatter are removed while passing through the cleaning unit is finally passed through the detector, the defect in the groove formed on the surface of the steel strip is checked, and then the steel strip is transferred to the post-process.

In the present embodiment, the presence or absence of the defect in the groove formed on the surface of the steel strip is determined by measuring a leakage magnetic flux with respect to the groove of the steel strip by a leakage magnetic flux measuring method. While passing through the detector, the magnetic flux leakage of the surface of the steel strip magnetized by the magnetizer is detected through the magnetic sensor. By calculating the leakage magnetic flux detected in the groove of the steel strip, it is possible to confirm whether or not the groove is defective.

Figure 7:
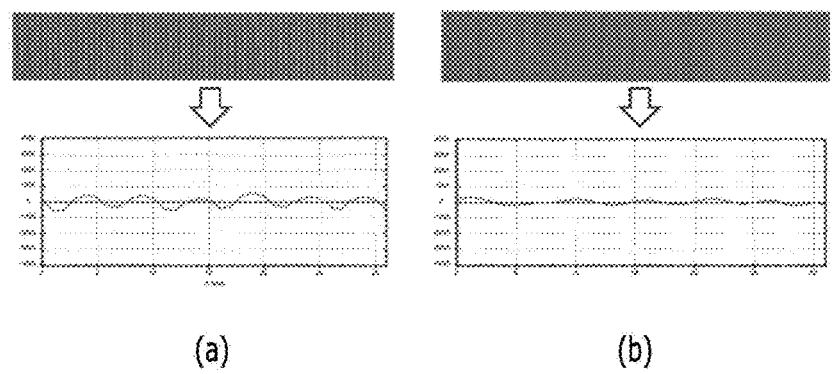
FIG. 7 is a drawing showing a defect detection result of a groove formed in a steel strip according to an embodiment.

FIG. 7 illustrates a defect detection result of the groove formed in the steel strip according to the present embodiment. FIG. 7 (a) illustrates a measurement result in which the groove processing state is good, and FIG. 7 (b) illustrates a measurement result in which the groove processing state is poor.

As described above, it is possible to accurately detect the groove processing state of the steel strip through the measurement of the leakage magnetic flux, thereby confirming whether or not there is a defect.

As described above, when the defective groove is detected through the process of confirming whether or not the groove formed on the surface of the steel strip is defective, a correcting process of adjusting the laser focus position with respect to the steel strip is performed.

In the present embodiment, the correcting process may include a process of setting a groove depth in a steady state as a reference value, a calculating process of comparing the depth of the detected groove with the reference value, and a position adjustment process of adjusting the focal position by adjusting the position of the steel strip supporting roll or the position of the condensing mirror according to the depth deviation of the groove detected in the calculating process.

When the position of the steel strip supporting roll or the position of the condensing mirror is adjusted, the distance between the condensing mirror and the steel strip may be adjusted to be suitable for the focal length of the laser beam. Hereinafter, an embodiment of adjusting the position of the steel strip supporting roll will be exemplarily described.

The steady state groove depth is obtained when the distance between the condensing mirror and the steel strip is equal to the focal length of the laser beam. In this state, the groove is formed normally and deeply on the surface of the steel strip with the focus being accurately formed on the surface of the steel strip. As such, the depth of the groove formed on the surface of the steel strip is set as a reference value which serves as a reference of a normal working state in the state in which the distance between the condensing mirror and the steel strip is the same as the focal distance of the laser beam. The reference value means a depth of the groove that is the reference of the normal working state. In addition to setting the reference value in an initial process for laser groove processing, an initial position setting process of setting the position of the steel strip supporting roll may be performed to set the laser beam focus position and the steel strip position.

In the initial position setting process, the position of the steel strip supporting roll may be changed according to a set time interval, a change in the depth of the groove according to the position of the steel strip supporting roll may be detected, and when the depth of the groove is deepest, the position of the steel strip supporting roll may be calculated through the steel strip supporting roll position and depth data thereof such that the position of the steel strip supporting roll or the position of the condensing mirror for irradiating the laser may be adjusted according to the calculated value.

The position of the steel strip supporting roll is varied according to the set time while irradiating the laser beam to the steel strip in the initial process, and the groove depth corresponding to the position of the steel strip supporting roll is stored as data.

Figure 8:
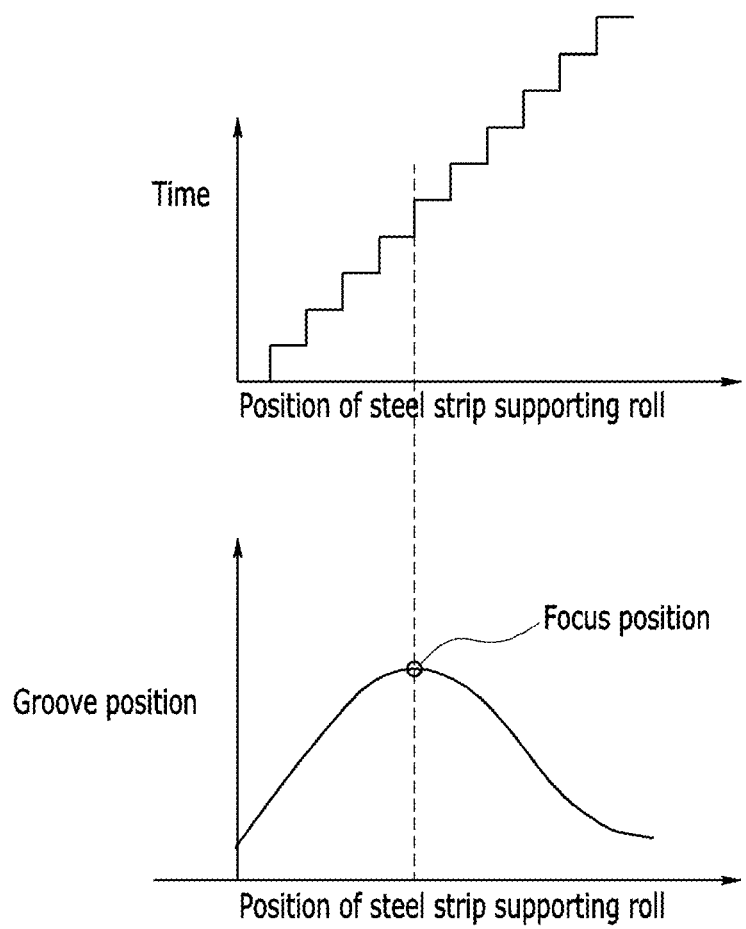
FIG. 8 is a graph for explaining an initial position setting process according to an embodiment.

FIG. 8 is a graph showing change data in the steel strip supporting roll position for each time and the groove depth corresponding to the steel strip supporting roll position.

The laser beam irradiation time is longer than 5 seconds in a state in which the steel strip supporting roll is maintained at the same position so that the groove depth corresponding to the steel strip supporting roll position may be clearly distinguished and detected. When the laser beam irradiation is finished, the laser beam is irradiated again for 5 seconds or more in the fixed state by changing the position of the steel strip supporting roll by a predetermined amount. A steel strip supporting roll position adjustment range is set so that the laser beam focal position is within the steel strip supporting roll position adjustment range.

As shown in FIG. 8, as the position of the steel strip supporting roll is changed, the steel strip position is changed with respect to the laser beam focus position, and the groove depth is changed. The steel strip supporting roll position at which the grooves are processed most deeply becomes the focal position of the laser beam.

In order to form the focus of the laser beam on the steel strip, the distance between the condensing mirror and the steel strip must be the same as the focal distance. The distance between the condensing mirror and the steel strip at the derived steel strip supporting roll position is the focal distance of the laser beam. Therefore, the position of the steel strip may be adjusted to be suitable for the focal distance while changing the position of the steel strip supporting roll in a stepwise manner. In addition, as the position of the steel strip supporting roll is set such that the laser beam is accurately focused on the steel strip, the depth of the groove obtained in this state may be immediately set as the reference value.

In the conventional case, it takes 24 hours or longer to reset the focus position after maintenance work of the optical system or replacement of the constituent elements, thereby causing a decrease in productivity. On the other hand, in the present embodiment, the initial position setting process of focusing on the steel strip may be quickly performed within 30 minutes. Therefore, in the case of the present embodiment, high productivity may be maintained through the quick working process.

As described above, when the initial position of the steel strip supporting roll is set and the reference value is set, the normal work is started and the groove is continuously machined on the surface of the steel strip at the normal depth that is same as the reference value.

When the focal position of the laser beam with respect to the steel strip is changed in accordance with the state change of the optical system or the steel strip during the laser machining process for the steel strip, the groove depth is changed.

An actual depth of the groove formed on the surface of the steel strip is detected in real time through the detector. The detector compares and calculates the depth of the actual groove of the detected steel strip and the reference value to determine whether or not there is a deviation. Then, the position of the steel strip supporting roll is adjusted in accordance with the depth deviation of the groove detected when the deviation occurs. Accordingly, the position of the steel strip is varied in the process, so that the distance between the steel strip and the condensing mirror is adjusted. Therefore, the steel strip is positioned again at the focal point of the laser beam, so that the defective formation of the groove may be corrected, thereby performing the groove process in the best conditions.

Figure 9:
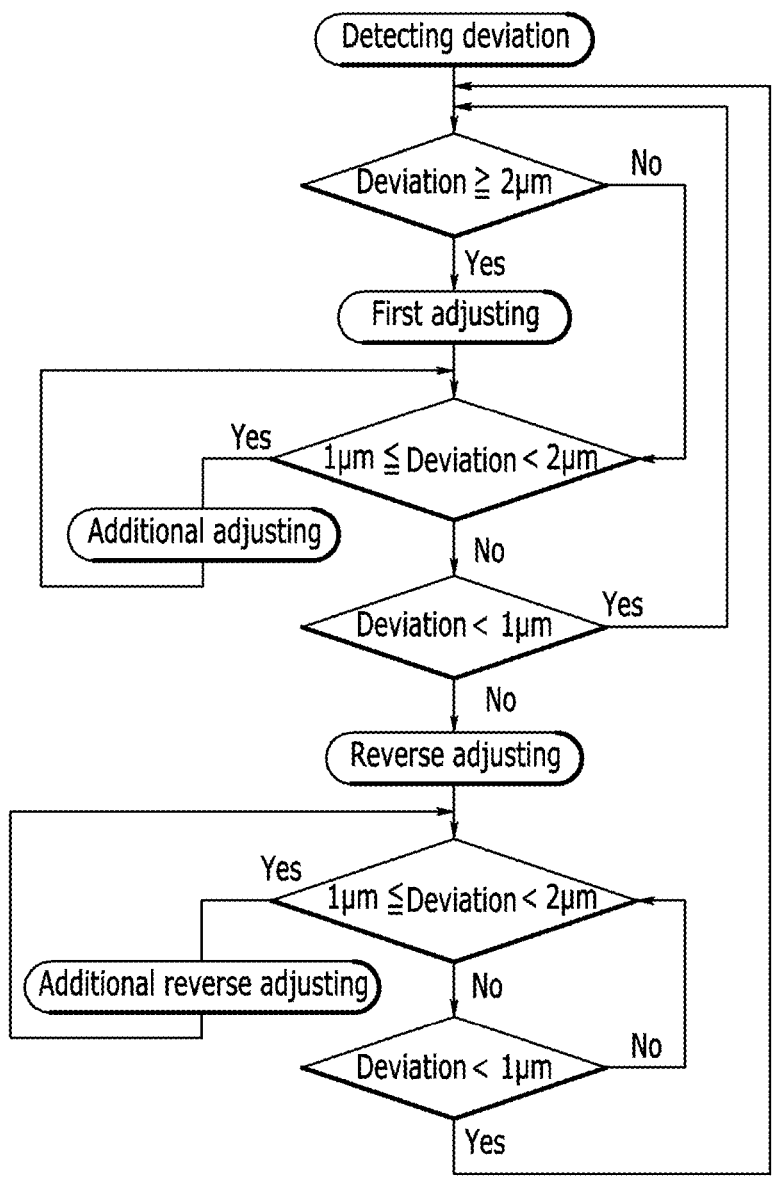
FIG. 9 illustrates a schematic flowchart of a groove defect correcting process according to an embodiment.

A process of adjusting the position of the steel strip supporting roll will be described with reference to FIG. 9.

The process of adjusting the position of the steel strip supporting roll includes a first adjusting step of adjusting the position of the steel strip supporting roll in one of up and down directions when a deviation is 2 μm or more, an additional adjusting step of comparing and calculating a depth of the groove detected after the first adjusting and the reference value and then further adjusting the position of the steel strip supporting roll in the same direction as the first adjusting when the calculated deviation is less than 2 μm and equal to or greater than 1 μm, a reverse adjusting step of adjusting the position of the steel strip supporting roll in a direction opposite to that of the first adjusting when the depth of the groove detected after the first adjusting is compared with the reference value to determine that the depth is 2 μm or more, and an additional reverse adjusting step of comparing and calculating the depth of the groove detected after the reverse adjusting and the reference value and then adjusting the position of the steel strip supporting roll by DF/2 in the same direction as the reverse adjusting when the calculated depth deviation is less than 2 μm and equal to or greater than 1 μm.

The deviation means a difference between the reference value of the depth of the groove and the depth of the actually detected groove. The deviation occurring reason is that as the distance between the condensing mirror and the steel strip is different from the focal distance of the laser beam, the focus is not accurately focused on the steel strip. That is, the reason is that the distance between the condensing mirror and the steel strip is shorter or longer than the focal distance. When the distance is short, the steel strip is moved away from the condensing mirror along a downward direction, and when it is long, the steel strip is moved upward toward the condensing mirror, thereby correcting it. In the present embodiment, the steel strip is first moved in one direction to check whether the defect occurs because the distance between the condensing mirror and the steel strip is shorter than the focal distance or because it is longer than that, and a correcting process is performed based on the checked result.

In the first adjusting step, the position of the steel strip supporting roll may be adjusted by DF/2 when the deviation is 2 μm or more. The DF means a depth of focus. For example, in the first adjusting step, the position of the steel strip supporting roll may be adjusted by DF/2 in the downward direction.

As the steel strip supporting roll is moved downward, the distance between the condensing mirror and the steel strip becomes longer. When the deviation with respect to the groove depth occurs because the distance between the condensing mirror and the steel strip is shorter than the focal distance, the deviation is reduced through the first adjusting process.

Therefore, when the deviation is again detected after the first adjusting and the deviation is further reduced, an additional adjustment is performed according to the deviation value. That is, when the deviation after the first adjusting is equal to and greater than 1 μm and less than 2 μm, the deviation is further reduced through the additional adjustment. In the present embodiment, the additional adjusting step may further adjust the position of the steel strip supporting roll by DF/2 in the same downward direction as in the first adjusting. The deviation may be further reduced through the additional adjusting step. As shown in FIG. 9, when the deviation after the additional adjustment process is reduced to less than 1 μm, the above processes are repeated to perform the correction in the state in which the defect with respect to the depth of the groove is corrected.

On the other hand, when the deviation after the first adjusting is larger, the deviation with respect to the groove depth occurs because the distance between the condensing mirror and the steel strip is longer than the focal distance.

Accordingly, the position of the steel strip supporting roll is moved upward to reduce the deviation.

When the deviation increases without decreasing after the first adjusting, the position of the steel strip supporting roll is moved upward. In the present embodiment, the position of the steel strip supporting roll is moved upward by DF. Since the steel strip supporting roll is moved downward by DF/2 in the first adjusting, it is moved by DF/2 in the reverse direction to be recovered to the state before the first adjusting and then moved upward by DF/2 for correction. Thus, it is necessary to move the steel strip supporting roll by DF in the upward direction for the correction after the first adjusting.

As the steel strip supporting roll is moved upward, the distance between the condensing mirror and the steel strip becomes shorter. Since the deviation with respect to the groove depth occurs because the distance between the condensing mirror and the steel strip is longer than the focal distance, the deviation is reduced through the reverse adjusting process.

Therefore, when the deviation is again detected after the reverse adjusting and the deviation is further reduced, additional reverse adjusting is performed according to the deviation value. That is, when the deviation after the reverse adjusting is equal to and greater than 1 μm and less than 2 μm, the deviation is further reduced through the additional reverse adjusting. In the present embodiment, the additional reverse adjusting step may further adjust the position of the steel strip supporting roll by DF/2 in the same upward direction as in the reverse adjusting. The deviation may be further reduced through the additional reverse adjusting step. As shown in FIG. 9, when the deviation after the additional reverse adjusting process is reduced to less than 1 μm, the above processes are continuously repeated to perform the correction in the state in which the defect with respect to the depth of the groove is corrected.

As described above, according to the present embodiment, by detecting the change of the focal position of the laser beam in accordance with the state change of the optical system or the steel strip in real time in the groove machining process for the steel strip, it is possible to accurately form the focus on the steel strip, thereby maintaining the groove processability at the highest level.

TABLE 1

| Iron loss Improvement ratio (%) | |
| --- | --- |
| After laser irradiation | After heat treatment |
| 9.5 | 11.6 |
| 9.7 | 12.9 |
| 11.5 | 13.5 |
| 8.4 | 11.6 |
| 8.6 | 11.8 |
| 8.5 | 11.7 |

Table 1 shows the iron loss improvement ratio of the grain-oriented electrical steel strip by the groove formed on the surface of the steel strip of a 0.27 mm thickness by the continuous wave laser beam irradiation according to the present embodiment. As shown in Table 1, in the case of the steel strip in which the magnetic domain is refined in the present embodiment, it can be seen that the iron loss was improved both after the laser irradiation and after refining the magnetic domain by the laser and then performing the heat treatment.

While the present invention has been illustrated and described in connection with what is presently considered to be practical embodiments, it is to be understood that the invention is implemented in various different forms by those of ordinary skill in the art. The present invention is intended to cover 113 various modifications and equivalent arrangements included within the spirit and scope of the appended claims.

DESCRIPTION OF SYMBOLS

| | |
| --- | --- |
| 1: steel strip | 2A, 2B: steering roll (SR) |
| 3: steel strip center position control system | |
| 4: meandering measuring sensor | |
| 5A, 5B: tension bridle roll | 6: steel strip tension control system |
| 7: steel strip tension measuring sensor | |
| 8A: deflector roll | |
| 8B: deflector roll | 8C: medium deflector roll |
| 9: steel strip supporting roll | 10: luminance measuring sensor |
| 11: distance measuring sensor | |
| 12: steel strip supporting roll position control system | |
| 13: laser oscillator controller | 14: laser oscillator |
| 15: optical system | 16: laser beam |
| 17: air knife | 18: shielding portion |
| 19A, 19B, 19C: dust collecting hood | |
| 20: laser room | |
| 21: shower booth | 22A, 22B, 22C, 22D: air curtain |
| 23: positive pressure device | 24: optical system lower frame |
| 25: constant temperature and humidity controller | |
| 26A, 26B: brush roll | |
| 27: motor current control system | |
| 28: brush position control system | |
| 29: cleaning unit | 30: filtering portion |
| 31: irradiation line | 32: polygonal mirror |
| 33: rotating motor | 34: driving motor |
| 35: condensing mirror | 36: driver |
| 37: module plate | 38: shutter |
| 39: header | 50: detector |
| 51: non-conductive roll | 52: leak magnetic flux measurer |
| 53: magnetizer | 54: magnetic sensor |
| 55: controller | 56: signal changer |
| 57: calculator | 58: equipment controller |
| 59: driving controller | 60: rail |
| 61: moving carriage | 62: moving frame |
| 70: corrector | |

The invention claimed is:

1. An apparatus for refining a magnetic domain of a grain-oriented electrical steel strip, comprising:
   steel strip supporting roll position adjusting equipment that controls a position of a steel strip in up and down directions while supporting the steel strip moving along a production line,
   laser irradiating equipment that irradiates a laser beam on the steel strip to melt it to form a groove thereon, and
   a detector that detects whether or not the groove is defective by checking a state of the groove formed on the surface of the steel strip,
   wherein the detector includes: a non-conductive roll supporting a moving steel strip; a leakage flux measurer including a magnetizer that applies a magnetic force to the surface of the steel strip passing through the non-conductive roll to magnetize the surface of the steel strip, and a magnetic sensor that is spaced apart from the steel strip and measures a leakage magnetic field of the groove formed in the steel strip; and a controller that calculates an output signal of the magnetic sensor to check whether the groove is defective.

2. The apparatus for refining the magnetic domain of the grain oriented electrical steel strip of claim 1, wherein
   a corrector that adjusts a laser focal point position of the steel strip according to a result measured by the detector is included.

3. The apparatus for refining the magnetic domain of the grain oriented electrical steel strip of claim 2, wherein
   the steel strip supporting roll position adjusting equipment includes a steel strip supporting roll position control system that controls the position of the steel strip supporting roll, which supports the steel strip, according to a laser irradiation position of the laser irradiating equipment, and the corrector is connected to the steel strip supporting roll position control system and controls the steel strip supporting roll position control system according to a signal of the detector.

4. The apparatus for refining the magnetic domain of the grain oriented electrical steel strip of claim 1, wherein
   regarding the surface of the steel strip that proceeds while contacting a surface of the steel strip supporting roll in a form of a circular arc, the laser irradiating equipment irradiates a laser beam from a reference point which is a laser beam irradiation position set when an irradiation structure direction of a laser beam passes a central axis of the steel strip supporting roll, to a position spaced apart from a center of the steel strip supporting roll by a predetermined angle along an outer circumferential surface.

5. The apparatus for refining the magnetic domain of the grain oriented electrical steel strip of claim 1, wherein
   an optical system of the laser irradiating equipment has a structure that is rotatable by a driver and rotates with respect to the steel strip to change the angle of the irradiation line of the laser beam with respect to a width direction of the steel strip.

6. The apparatus for refining the magnetic domain of the grain oriented electrical steel strip of claim 1, wherein
   the controller includes a signal changer that changes the leakage magnetic field signal detected by the magnetic sensor to a groove size signal, and a calculator that compares and calculates a groove size reference value that is preset in a steady state and an actual groove size value outputted from the signal changer to determine whether the groove is defective.

7. The apparatus for refining the magnetic domain of the grain oriented electrical steel strip of claim 6, wherein
   the calculator compares the preset steady state groove size reference value and the actual groove size value outputted from the signal changer to determine whether the groove is defective.

8. The apparatus for refining the magnetic domain of the grain oriented electrical steel strip of claim 6, wherein
   the controller further includes an equipment controller that controls driving of the equipment in accordance with an output signal of the calculator.

9. The apparatus for refining the magnetic domain of the grain oriented electrical steel strip of claim 1, wherein
   the detector further includes a driver that adjusts an interval between the leakage magnetic flux measurer and the steel strip.

* * * * *